United States Patent
Ikeuchi et al.

(10) Patent No.: US 9,322,659 B2
(45) Date of Patent: Apr. 26, 2016

(54) MAP INFORMATION PROCESSING APPARATUS

(75) Inventors: Tomoya Ikeuchi, Tokyo (JP); Atsushi Kohno, Tokyo (JP); Tomohiro Nakae, Tokyo (JP); Masaharu Umezu, Tokyo (JP); Yasushi Kodaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 837 days.

(21) Appl. No.: 12/441,877

(22) PCT Filed: Jul. 26, 2007

(86) PCT No.: PCT/JP2007/064684
§ 371 (c)(1),
(2), (4) Date: Mar. 18, 2009

(87) PCT Pub. No.: WO2008/050516
PCT Pub. Date: May 2, 2008

(65) Prior Publication Data
US 2010/0042315 A1    Feb. 18, 2010

(30) Foreign Application Priority Data

Oct. 18, 2006    (JP) .................................. 2006-284271

(51) Int. Cl.
*G01C 21/30*   (2006.01)
*G01C 21/32*   (2006.01)
*G01C 21/34*   (2006.01)

(52) U.S. Cl.
CPC ...................................... *G01C 21/32* (2013.01)

(58) Field of Classification Search
CPC .... G01C 21/00; G01C 21/34; G01C 21/3694; G01C 21/3697

USPC ......................................................... 701/200
See application file for complete search history.

(56) References Cited

U.S. PATENT DOCUMENTS

| | | | |
|---|---|---|---|
| 5,899,955 A * | 5/1999 | Yagyu et al. | 701/209 |
| 6,075,467 A | 6/2000 | Ninagawa | |
| 6,356,837 B1 * | 3/2002 | Yokota et al. | 701/208 |
| 6,650,998 B1 * | 11/2003 | Rutledge et al. | 707/705 |
| 6,662,105 B1 * | 12/2003 | Tada et al. | 701/420 |
| 7,161,503 B2 * | 1/2007 | Takayanagi | 340/995.12 |
| 2003/0028318 A1 * | 2/2003 | Kaji et al. | 701/209 |
| 2005/0102098 A1 * | 5/2005 | Montealegre et al. | 701/209 |

(Continued)

FOREIGN PATENT DOCUMENTS

| | | |
|---|---|---|
| DE | 198 37 618 A1 | 3/1998 |
| DE | 103 18 179 A1 | 3/2004 |

(Continued)

*Primary Examiner* — Neha Patel
(74) *Attorney, Agent, or Firm* — Birch, Stewart, Kolasch & Birch, LLP

(57) ABSTRACT

A map information processing apparatus includes a map information storage unit 111 for storing map information which is separated into multiple layers, a layer-to-be-updated-with-addition determination processing unit 118 for determining one or more layers which are to be updated with addition of an unregistered road which has been detected during travel of a vehicle, and an unregistered road adding and updating unit 117 for adding the unregistered road to the map information storage unit to update the map information with the addition being aimed at the one or more layers determined by the layer-to-be-updated-with-addition determination processing unit.

7 Claims, 23 Drawing Sheets

(56) References Cited

U.S. PATENT DOCUMENTS

| | | |
|---|---|---|
| 2005/0288851 A1 | 12/2005 | Yokota |
| 2007/0244636 A1* | 10/2007 | Horikami ...................... 701/208 |
| 2010/0023255 A1* | 1/2010 | Nambata ...................... 701/201 |
| 2010/0042315 A1 | 2/2010 | Ikeuchi et al. |

FOREIGN PATENT DOCUMENTS

| | | |
|---|---|---|
| DE | 103 51 727 A1 | 5/2004 |
| DE | 102 58 470 A1 | 7/2004 |
| JP | 10-019589 | 1/1998 |
| JP | 11-37783 A | 2/1999 |
| JP | 11-65436 A | 3/1999 |
| JP | 2002-175593 A | 6/2002 |
| JP | 2002-206938 A | 7/2002 |
| JP | 2003-65770 A | 3/2003 |
| JP | 2004-12214 A | 1/2004 |
| JP | 2005-3700 A | 1/2005 |
| JP | 2005-91225 A | 4/2005 |
| JP | 2005-172578 A | 6/2005 |
| JP | 4467630 B2 | 3/2010 |
| JP | 2010-78615 A | 4/2010 |

* cited by examiner

| Graphical Scale | Map Information Layer |
|---|---|
| 50m | 1 |
| 100m | 2 |
| 200m | 2 |
| 500m | 3 |
| 1km | 3 |
| 2km | 4 |
| 5km | 4 |
| 10km | 5 |
| 20km | 5 |
| 50km | 6 |
| 100km | 6 |

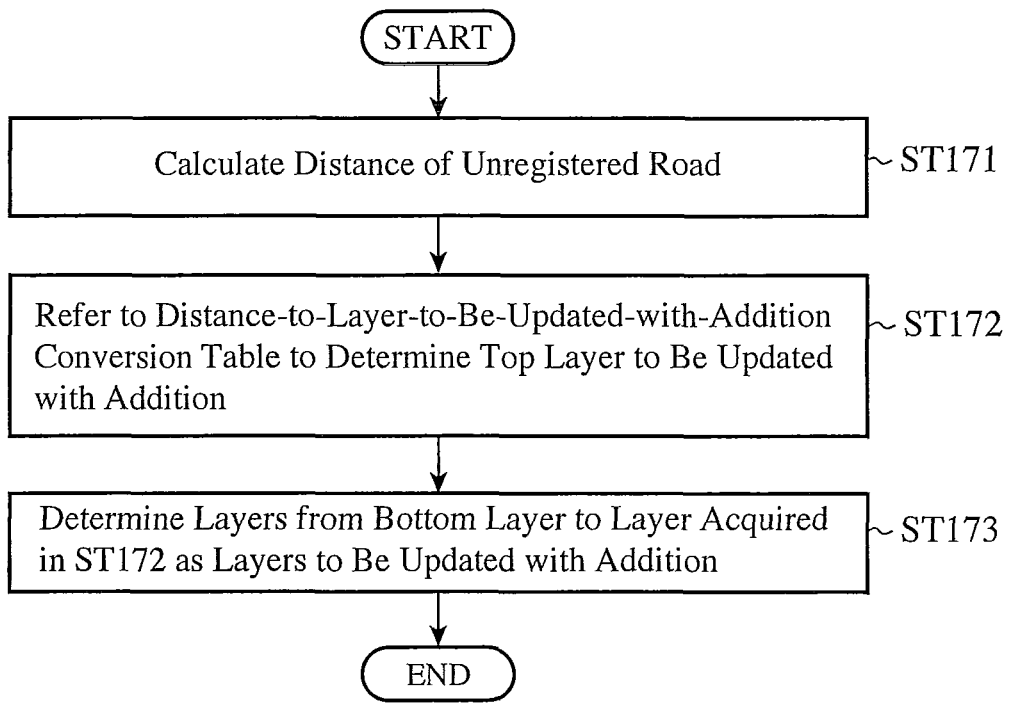

| Distance | Map Information Layer |
|---|---|
| Less Than 100m | 1 |
| ~to Less Than 500m | 2 |
| ~to Less Than 2km | 3 |
| ~to Less Than 10km | 4 |
| Equal to or Greater Than 10km | 5 |

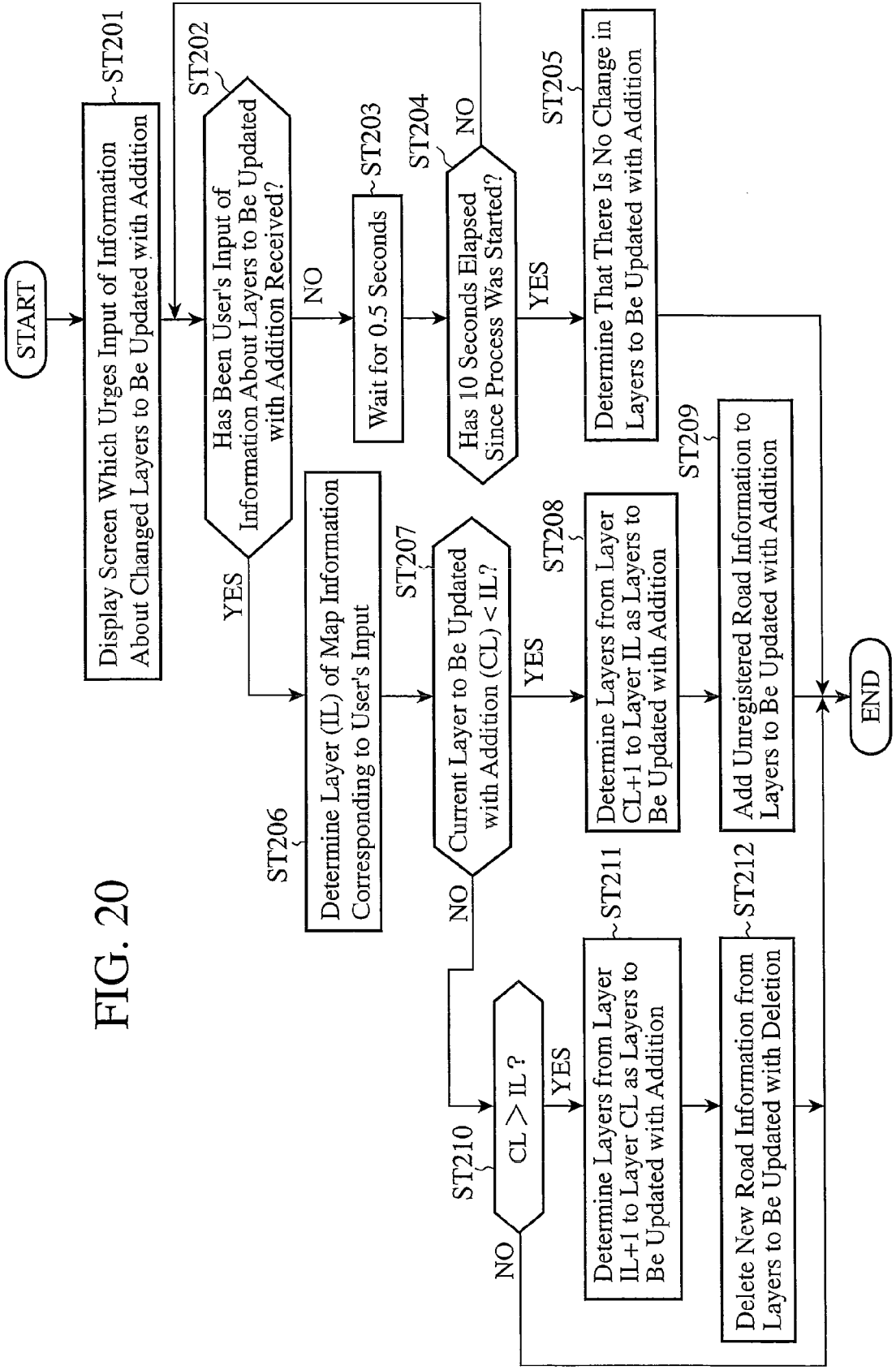

| Number of Usage Times | Map Information Layer |
|---|---|
| 3 Times | 1 |
| ~to 5 Times | 2 |
| ~to 10 Times | 3 |
| ~to 20 Times | 4 |
| 20 Times or More | 5 |

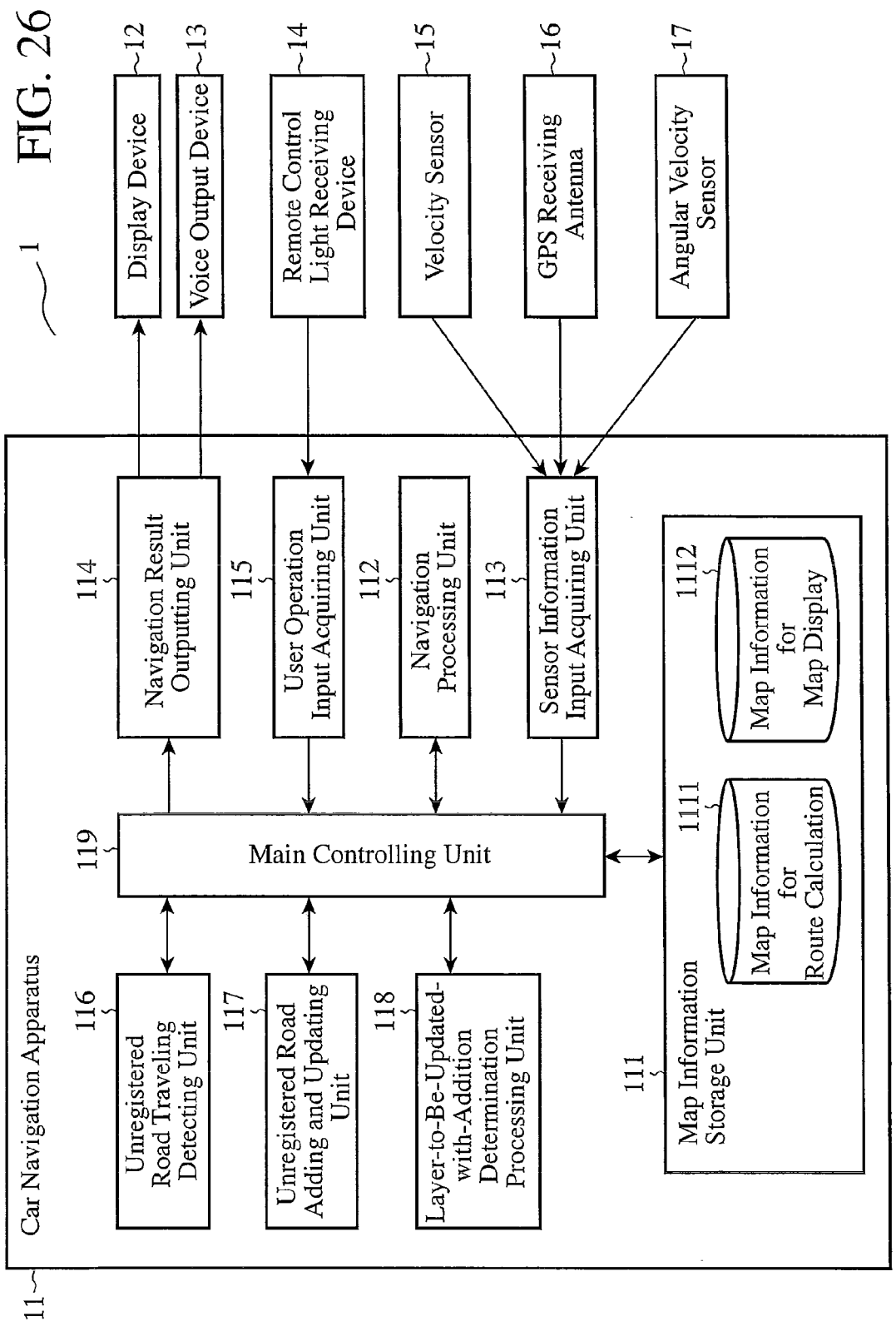

MAP INFORMATION PROCESSING APPARATUS

FIELD OF THE INVENTION

The present invention particularly relates to a map information processing apparatus which is suitable for use in a car navigation system.

BACKGROUND OF THE INVENTION

When a vehicle equipped with a car navigation system travels along a road which does not exist in map information held by the car navigation system, the car navigation system detects the unregistered road by comparing the travel history of the vehicle with the map information held thereby, and carries out an update of the map information held thereby with addition of the unregistered road.

For example, a technology of, when detecting a new road (referred to as an unregistered road) whose information is not included in the map information on the basis of the traveling path of the vehicle, carrying out an update with addition of the unregistered road, as well as addition of restrictions on the road or attendant information about the road, like the width of the road, on the basis of the traveling path corresponding to the unregistered road is known (for example, refer to patent reference 1).

[Patent reference 1] JP, 2005-172578, A

The technology disclosed by above-mentioned patent reference 1 makes it possible for the user to receive a service based on the newest map information without having to acquire the new map information. This technology provides the user with a large profit because the cost of acquiring the new map information is expensive and the amount of the map information is huge.

However, in many cases, the map information is stored with being separated into a plurality of layers according to the degree of detail of the stored data. In contrast with this, patent reference 1 discloses only the technology about detection of an unregistered road and settings of attendant information, and therefore cannot carry out navigation while reflecting a detected unregistered road in the plurality of layers (carrying out an update with addition of the unregistered road to the plurality of layers).

The present invention is made in order to solve the above-mentioned problem, and it is therefore an object of the present invention to provide a map information processing apparatus which, when adding, as additional map information, an unregistered road which has been detected during travel of a vehicle and whose information is not included in map information stored therein to update this map information, determines layers which are to be updated with the addition according to the state of the unregistered road and the user's intention so as to enable navigation using the unregistered road, such as a display of a wide-area map and a determination of a long distance route.

DISCLOSURE OF THE INVENTION

A map information processing apparatus in accordance with the present invention includes: a map information storage unit for storing map information which is separated into multiple layers; a layer-to-be-updated-with-addition determination processing unit for determining one or more layers which are to be updated with addition of an unregistered road whose information is not included in the map information and which is detected when a vehicle has traveled; and an unregistered road adding and updating unit for adding the unregistered road to the map information storage unit to update the map information with the addition being aimed at the one or more layers determined by the layer-to-be-updated-with-addition determination processing unit.

A map information processing apparatus in accordance with the present invention includes: a map information storage unit for storing map information which is separated into multiple layers; a layer-to-be-updated-with-addition determination processing unit for determining one or more layers which are to be updated with addition of an unregistered road whose information is not included in the map information and which is detected when a vehicle has traveled; and a navigation processing unit for carrying out navigation by using both the unregistered road in the one or more layers determined by the layer-to-be-updated-with-addition determination processing unit, and the map information stored in the map information storage unit.

A map information processing apparatus in accordance with the present invention includes: a map information storage unit for storing map information which is separated into multiple layers; an external information input acquiring unit for acquiring road information whose information is not included in the map information from outside the map information processing apparatus; a layer-to-be-updated-with-addition determination processing unit or determining one or more layers which are to be updated with addition of the unregistered road on a basis of the road information acquired by the external information input acquiring unit; and an unregistered road adding and updating unit for adding the unregistered road to the map information storage unit to update the map information with the addition being aimed at the one or more layers determined by the layer-to-be-updated-with-addition determination processing unit.

A map information processing apparatus in accordance with the present invention includes: a map information storage unit for storing map information which is separated into multiple layers; an external information input acquiring unit for acquiring road information whose information is not included in the map information from outside the map information processing apparatus; a layer-to-be-updated-with-addition determination processing unit or determining one or more layers which are to be updated with addition of the unregistered road on a basis of the road information acquired by the external information input acquiring unit; and a navigation processing unit for carrying out navigation by using both the unregistered road in the one or more layers determined by the layer-to-be-updated-with-addition determination processing unit, and the map information stored in the map information storage unit.

In accordance with the present invention, when carrying out an update with addition of an unregistered road which has been detected during travel to the map information, the map information processing apparatus determines layers which are to be updated with addition of the unregistered road to the map information according to the state of the unregistered road, thereby making it possible to carry out navigation, such as a display of a wide-area map and a determination of a long distance route, by using the unregistered road.

BRIEF DESCRIPTION OF THE FIGURES

FIG. 16 is a view showing an example of the data structure of a conversion table for use in the map information processing apparatus in accordance with Embodiment 5 of the present invention;

FIG. 17 is a flow chart which is referred to in order to explain the operation of the map information processing apparatus in accordance with Embodiment 6 of the present invention;

FIG. 20 is a flow chart which is referred to in order to explain the operation of the map information processing apparatus in accordance with Embodiment 7 of the present invention;

FIG. 26 is a block diagram showing the internal structure of a map information processing apparatus in accordance with Embodiment 9 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
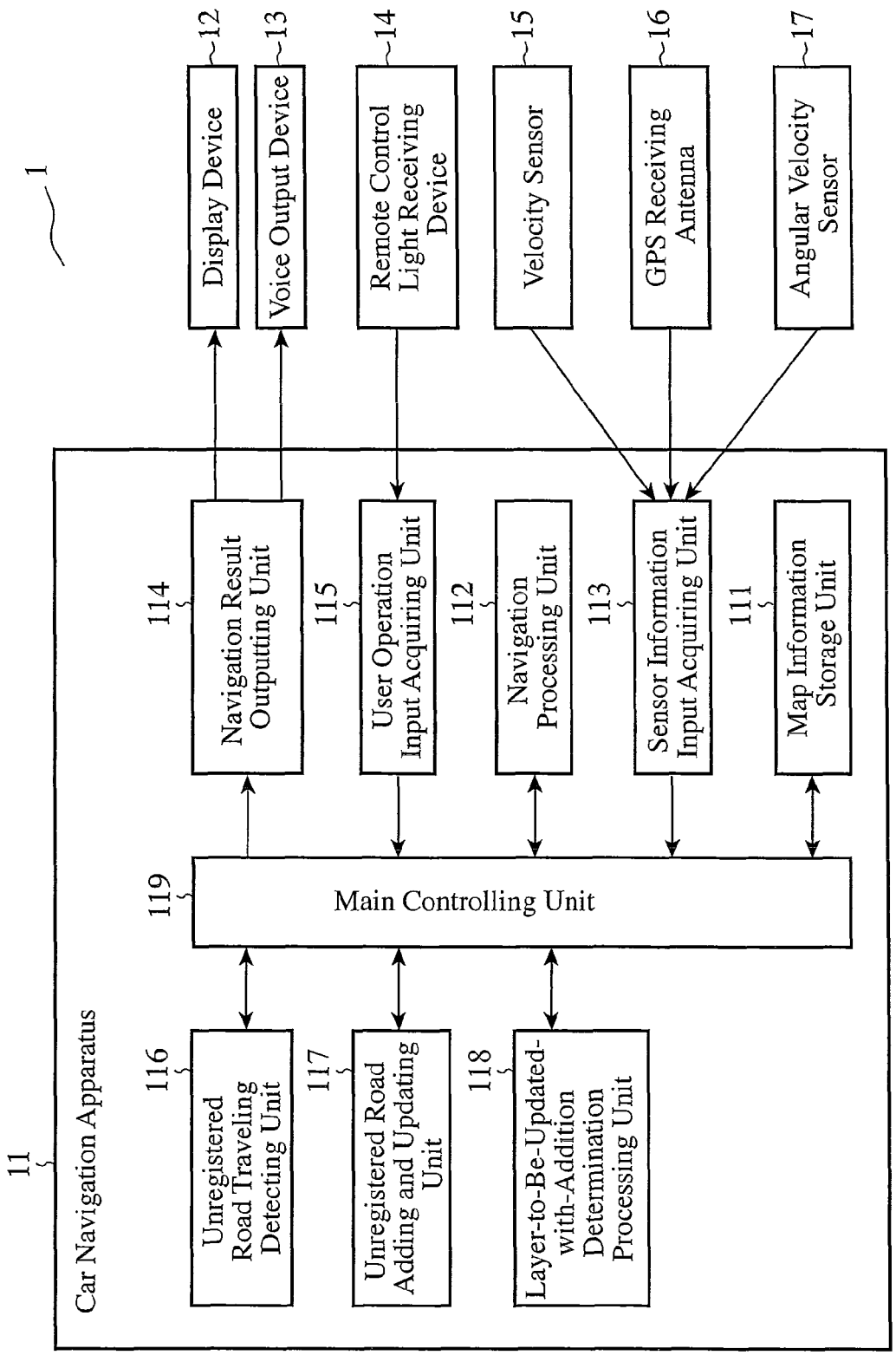
FIG. 1 is a block diagram showing the internal structure of a map information processing apparatus in accordance with Embodiment 1 of the present invention.

FIG. 1 is a block diagram showing the internal structure of a map information processing apparatus in accordance with Embodiment 1 of the present invention. In this case, a car navigation system 1 is illustrated as an example of the map information processing apparatus.

The car navigation system 1 is comprised of a car navigation apparatus 11 which serves as a control center for navigation, a display device 12 for displaying a map image for display and information about an optimal route which are generated and outputted by the car navigation apparatus 11, a voice output device 13 for outputting either a voice with which to perform a guidance to the destination according to the optimal route, or information included in map information by voice, a remote control light receiving device 14 for receiving a signal from an input device, such as a wireless remote control, which is manipulated by the user, a velocity sensor 15 for measuring the traveling velocity of a vehicle in which the car navigation system 1 is mounted, a GPS receiving antenna 16 for receiving signals from GPS (Global Positioning System) satellites, and an angular velocity sensor 17 for measuring a directional change in the vehicle.

The car navigation apparatus 11 is comprised of a map information storage unit 111, a navigation processing unit 112, a sensor information input acquiring unit 113, a navigation result outputting unit 114, a user operation input acquiring unit 115, an unregistered road traveling detecting unit 116, an unregistered road adding and updating unit 117, a layer-to-be-updated-with-addition determination processing unit 118, and a main controlling unit 119 for managing delivery of data exchanged among the above-mentioned blocks 111 to 118, and for performing sequence control.

The map information storage unit 111 consists of a storage medium (e.g., an HDD: Hard Disk Drive) for storing rewritable nonvolatile data, and, when the car navigation system 1 is shipped, map information (initial map information) is recorded into the map information storage unit in advance. An area for storing pieces of map information to each of which information about a road whose information does not exist in the initial map information is added is set up in the map information storage unit 111.

These pieces of map information are separated into a plurality of layers according to the degree of detail of the data stored, the plurality of layers including a bottom layer and a top layer which is a layer for storing only information used for separately drawing a sea and a land which do not include any road information, and the density of roads whose information is stored in each of layers between the upper and bottom layers gradually becomes thinner as each of the middle layers is located at a higher level. The map information about a lower layer is used for display of a detailed map, determination of a short distance route, etc., and the map information about an upper layer is used for display of a wide-area map, determination of a long distance route, etc. Furthermore, in the initial map information, each layer's map information is divided into a plurality of areas (meshes).

The navigation processing unit 112 has a current position measuring function of determining the current position of the vehicle by using information acquired via the sensor information input acquiring unit 113, and also referring to the map information stored in the map information storage unit 111 so as to determine a position on a road where the current position exists with the highest probability, a map displaying function of generating a position for display of either a point in the vicinity of the current position to be displayed at a display position or an arbitrary point, a route determining function of determining an optimal route from the current position to an arbitrary point or between two arbitrary points, and a route guiding function of providing guidances until the vehicle reaches the destination, such as an advice to make a right or left-hand turn, according to the optimal route calculated by the route determining function. The navigation processing unit carries out these functions with reference to the map information stored in the map information storage unit 111.

In this case, the results of the navigation are outputted to either the display device 12 or the voice output device 13, or both of them via the main controlling unit 119 and the navigation result outputting unit 114.

The sensor information input acquiring unit 113 acquires signals detected by various sensors (the velocity sensor 15, the GPS receiving antenna 16, and the angular velocity sensor 17) which are used in order to determine the position of the vehicle, and outputs the signals to the main controlling unit 119.

The navigation result outputting unit 114 provides the results of the navigation processing carried out by the navigation processing unit 112 for the user by using either the display device 12 or the voice output device 13. The user operation input acquiring unit 115 acquires the description of the user's operational input which is received thereby via the remote control light receiving device 14, and outputs the description of the user's operational input to the main controlling unit 119. The user sets up a certain destination by using a wireless remote control as an input device, or sets up a point which the user desires to make the navigation system display in a map, and the degree of detail of the map. These pieces of information are acquired by the user operation input acquiring unit 115, and are then delivered to the navigation processing unit 112.

While the unregistered road traveling detecting unit 116 determines the current position of the vehicle on the basis of the signals from the velocity sensor 15, the GPS receiving antenna 16, and the angular velocity sensor 17 which are acquired by the sensor information input acquiring unit 113, the unregistered road traveling detecting unit 116 compares the current position which it has determined with the map information stored in the map information storage unit 111 to calculate which position of which road included in the map information corresponds to the current position of the vehicle.

At that time, in order to specify the road, the unregistered road traveling detecting unit calculates a correlation score to each of roads which exist in the vicinity of the current position of the vehicle, and determines, as the road, a road having the highest correlation score among roads whose correlation score exceeds a reference value. At that time, when no road whose correlation score exceeds the reference value exists, the unregistered road traveling detecting unit 116 registers the current position of the vehicle as an unregistered road traveling position, and, when detecting that the current position of the vehicle corresponds to one of the roads whose information is included in the map information again, detects the registered position as an unregistered road.

The unregistered road adding and updating unit 117 carries out an update of the map information with addition of the road information about the unregistered road detected by the unregistered road traveling detecting unit 116 to the map information storage unit 111 with an eye on one or more layers determined by the layer-to-be-updated-with-addition determination processing unit 118, which will be mentioned below.

The layer-to-be-updated-with-addition determination processing unit 118 determines one or more layers which are the target to be updated with addition when the unregistered road travel detecting unit 116 carries out an update of the map information with addition of the unregistered road to the map information storage unit 111. The layer-to-be-updated-with-addition determination processing unit carries out this operation with reference to the map information stored in the map information storage unit 111.

Hereafter, the operation of the layer-to-be-updated-with-addition determination processing unit 118 will be explained with reference to a road state sample shown in FIG. 2.

Figure 2:
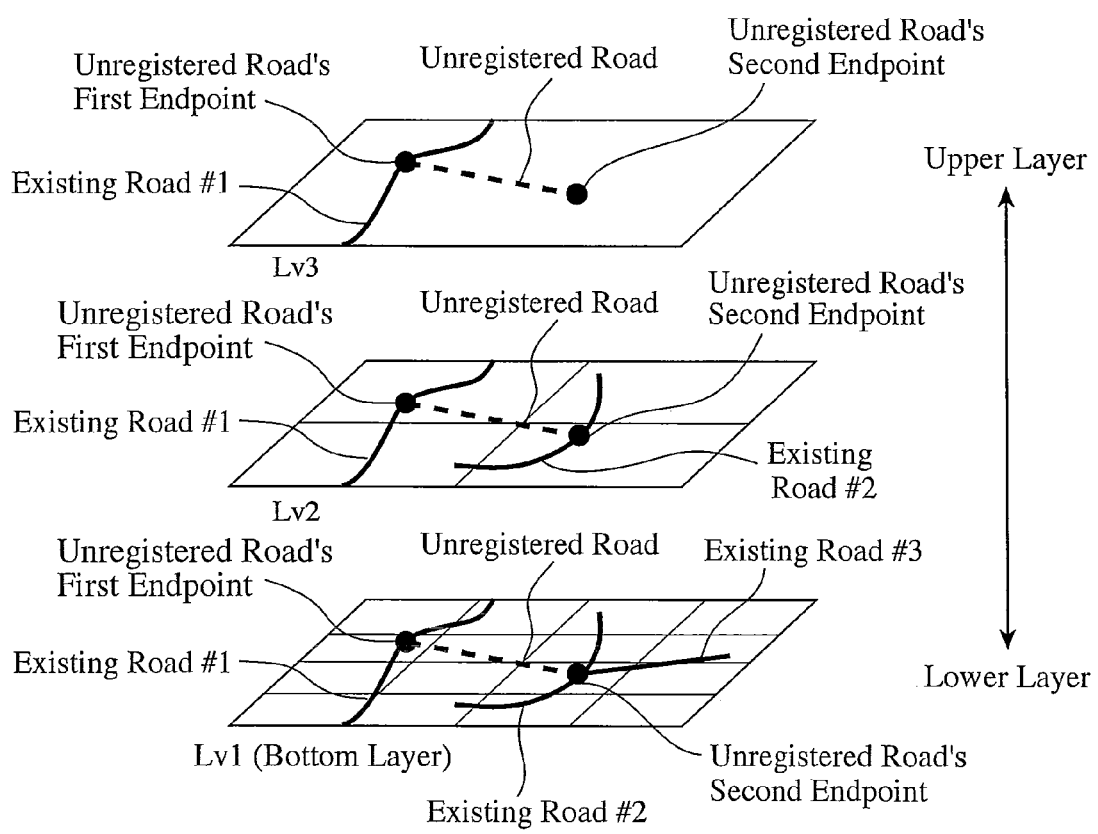
FIG. 2 is a view showing an example of a road state sample for use in the map information processing apparatus in accordance with Embodiment 1 of the present invention.

In FIG. 2, in Lv1 which is the bottom layer, pieces of information about three roads: an existing road #1, an existing road #2, and an existing road #3 are stored in the map information storage unit 111 as roads connected to an unregistered road (a dotted line). In contrast, the existing road #3 does not exist in Lv2 which is a layer higher than Lv1 and the existing road #2 does not exist in Lv3 which is further higher than Lv2, the figure shows that only the information about the existing road #1 is stored as map information in each of the layers. Furthermore, each layer's map information is comprised of a plurality of meshes (in Lv3, only one mesh is shown).

The layer-to-be-updated-with-addition determination processing unit 118 determines, as an uppermost layer to be added, a layer which is the highest one of layers in each of which at least one of the existing road #1, the existing road #2, and the existing road #3, which are connected to the unregistered road, exists. More specifically, the layer-to-be-updated-with-addition determination processing unit determines Lv3 in which the existing road #1 exists among the existing road #1, the existing road #2, and the existing road #3 as the uppermost layer, and determines the layers including the uppermost layer and the layers lower than the uppermost layer, i.e., Lv1, Lv2, and Lv3, as layers which are the target to be updated with addition.

Figure 3:
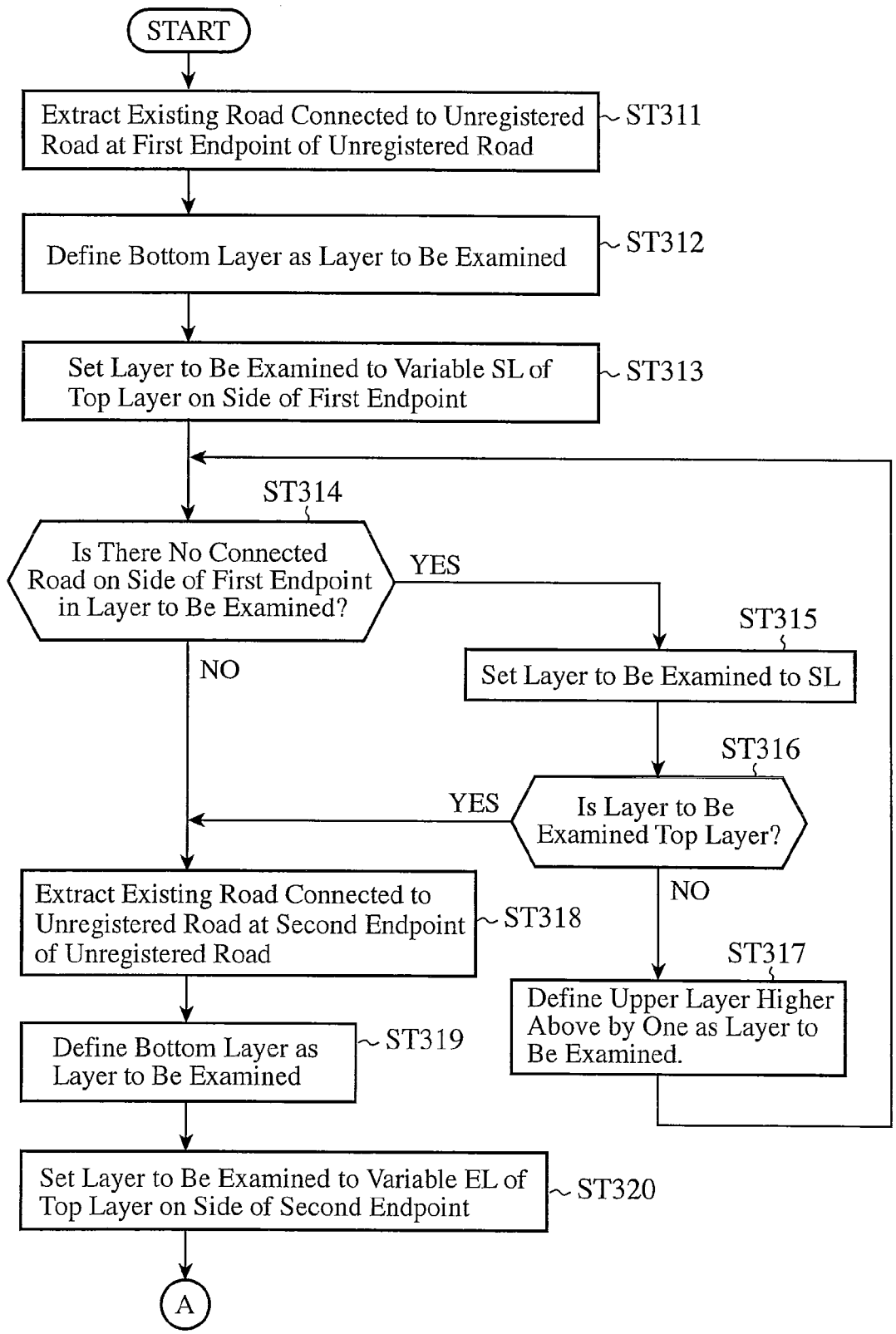
FIG. 3 is a flow chart which is referred to in order to explain the operation of the map information processing apparatus in accordance with Embodiment 1 of the present invention.
Figure 4:
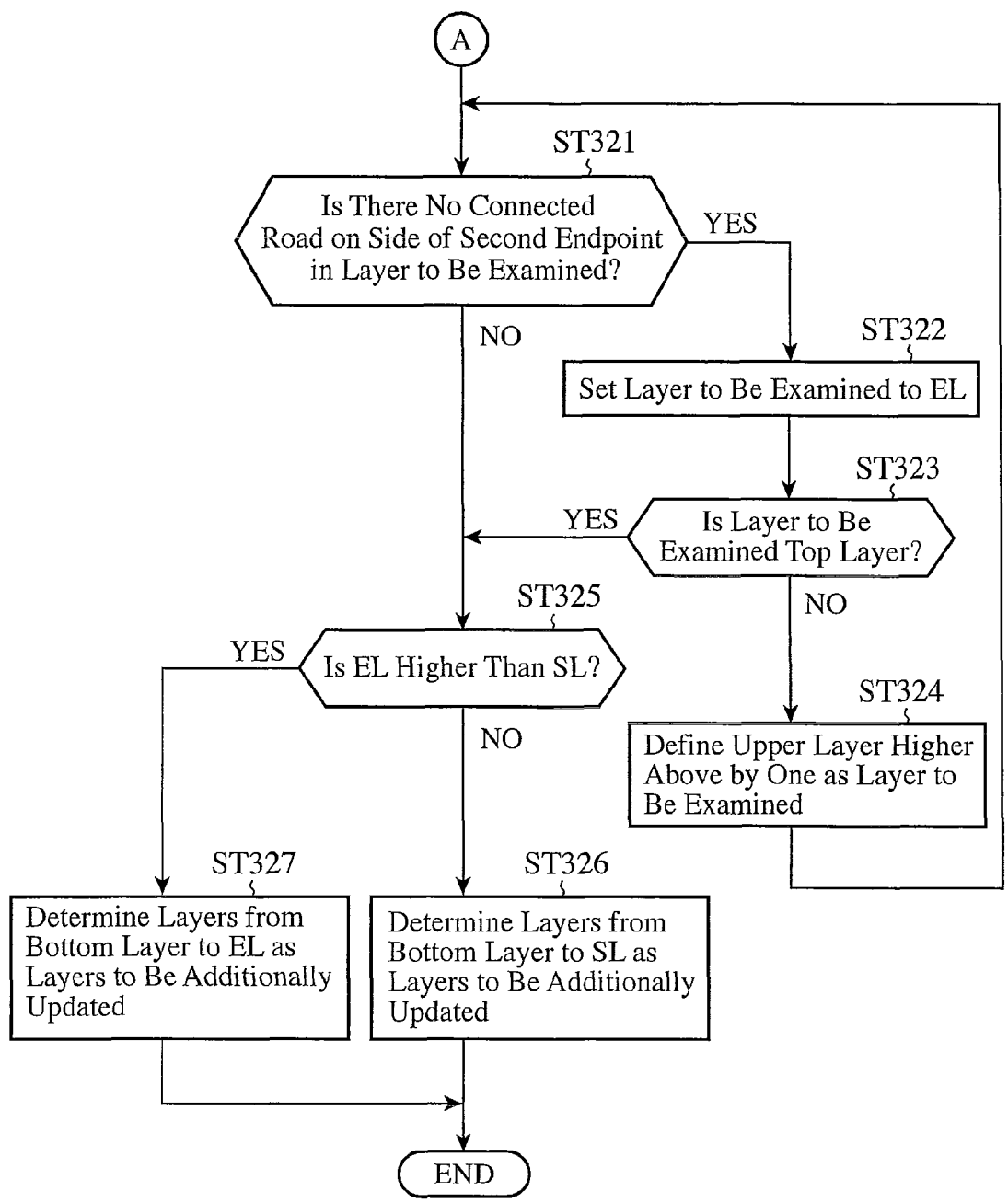
FIG. 4 is a flow chart which is referred to in order to explain the operation of the map information processing apparatus in accordance with Embodiment 1 of the present invention.

The operation of the layer-to-be-updated-with-addition determination processing unit 118 is shown in FIGS. 3 and 4 in the form of a flow chart.

Hereafter, the operation of the map information processing apparatus in accordance with Embodiment 1 of the present invention will be explained in detail with reference to the flow charts shown in FIG. 3 and FIG. 4 of the operation of the layer-to-be-updated-with-addition determination processing unit 118.

The layer-to-be-updated-with-addition determination processing unit 118 extracts roads connected to the first endpoint of the unregistered road as first-endpoint-side connected roads from among roads (existing roads) whose information exist in the map information stored in the map information storage unit 111 first (step ST311 of FIG. 3).

The layer-to-be-updated-with-addition determination processing unit 118 then defines the bottom layer as the layer to be examined (step ST312), and sets this layer to be examined (the bottom layer) to a first endpoint side top layer variable SL (step ST313). The layer-to-be-updated-with-addition determination processing unit then judges whether at least one of the first-endpoint-side connected roads extracted in step ST311 exists in the layer to be examined (step ST314).

When, in the process of step ST314, judging that at least one of the connected roads exists in the layer to be examined (when "Yes" in step ST314), the layer-to-be-updated-with-addition determination processing unit 118 sets the layer to be examined to SL (step ST315), and then judges whether or not the layer to be examined is the top layer (step ST316). When, in this step, judging that the target to be examined is not the top layer (when "No" in step ST316), the layer-to-be-updated-with-addition determination processing unit defines a layer one layer higher than the layer to be examined as a new layer to be examined (step ST317), and then returns to the process of step ST314.

In contrast, when judging that the object to be examined is the top layer (when "Yes" in step ST316), the layer-to-be-updated-with-addition determination processing unit ends the process about the first endpoint side. Also when, in the process of step ST314, judging that none of the connected roads exist in the layer to be examined (when "No" in step ST314, the layer-to-be-updated-with-addition determination processing unit ends the process about the first endpoint side.

After completing the process about the side of the first endpoint, the layer-to-be-updated-with-addition determination processing unit 118 carries out a process about the side of the second endpoint. At that time, the layer-to-be-updated-with-addition determination processing unit 118 extracts roads connected to the second endpoint of the unregistered road as second-endpoint-side connected roads from among the existing roads first (step ST318). The layer-to-be-updated-with-addition determination processing unit 118 then defines the bottom layer as the layer to be examined (step ST319), and sets this layer to be examined (the bottom layer) to a second endpoint side top layer variable EL (step ST320).

Next, the layer-to-be-updated-with-addition determination processing unit 118 judges whether at least one of the second-endpoint-side connected roads extracted in step ST318 exists in the layer to be examined (step ST321 of FIG. 4). When, in this step, judging that at least one of the connected roads exists in the layer to be examined (when "Yes" in step ST321), the layer-to-be-updated-with-addition determination processing unit 118 sets the layer to be examined to the second endpoint side top layer variable EL (step ST322), and then judges whether or not the layer to be examined is the top layer (step ST323). When judging that the target to be examined is not the top layer (when "No" in step ST323), the layer-to-be-updated-with-addition determination processing unit 118 defines a layer one layer higher than the layer to be examined as a new layer to be examined (step ST324), and then returns to the process of step ST321. In contrast, when judging that the object to be examined is the top layer (when "Yes" in step ST323), the layer-to-be-updated-with-addition determination processing unit ends the process about the second endpoint side. Also when, in the process of step ST321, judging that none of the connected roads exist in the layer to be examined (when "No" in step ST321, the layer-to-be-updated-with-addition determination processing unit ends the process about the second endpoint side.

When completing the process about the side of the second endpoint, as previously explained, the layer-to-be-updated-with-addition determination processing unit 118 compares the first endpoint side top layer variable SL with the second endpoint side top layer variable EL (step ST325). At this time, when judging that EL is not a layer higher than SL (when "No" in step ST325), the layer-to-be-updated-with-addition determination processing unit 118 defines layers from the bottom layer to EL as the target to be added (step ST326), and ends the process. In contrast, when, in the process of step ST325, judging that EL is a layer higher than SL (when "Yes" in step ST325), the layer-to-be-updated-with-addition determination processing unit 118 defines layers from the bottom layer to EL as the target to be added (step ST327), and ends the process.

In accordance with above-mentioned Embodiment 1, the map information processing apparatus includes the layer-to-be-updated-with-addition determination processing unit 118 for determining one or more layers which are the target to be updated with addition of an unregistered road, and the unregistered road adding and updating unit 117 carries out an update of the map information with addition of information about the unregistered road to the map information storage unit 111 with an eye on the one or more layers determined by the layer-to-be-updated-with-addition determination processing unit 118, thereby updating each high level layer's map information with addition of the information about the unregistered road to the map information. Therefore, the map information processing apparatus can use the unregistered road for display of a wide-area map and determination of a long distance route. Furthermore, because the map information processing apparatus carries out an update of each layer's map information in advance with addition of the information about the unregistered road to the layer's map information which requires the addition, the navigation processing unit 112 can maintain its processing performance at the time of using the map information.

In addition, because the layer-to-be-updated-with-addition determination processing unit 118 determines, as layers to be updated with addition, layers including a layer in which there exists at least one road to which the unregistered road is connected, and whose information is included in the map information stored in the map information storage unit 111, and lower level layers, the map information processing apparatus can use the unregistered road for up to a high level layer for which a presentation of the unregistered road is effective. For example, the map information processing apparatus can achieve higher processing performance by restricting layers which the map information processing apparatus uses for the route determination to the layers effective in the determination while checking the unregistered road by producing a display of a wide-area map or the like.

In accordance with above-mentioned Embodiment 1, the user operation input acquiring unit 115 is constructed in such a way as to acquire a signal from the wireless remote control disposed as an input device, which is received by the remote control light receiving device 14. The user operation input acquiring unit can be alternatively constructed in such a way as to acquire a signal form an input button (grounded to the input panel) placed in the front face of the car navigation apparatus 11, or acquire a signal inputted by a touch panel mounted on the display device 12. As an alternative, the user operation input acquiring unit can be constructed in such a way as to acquire a voice input, or acquire a signal from a combination of two or more of the above-mentioned devices.

Furthermore, the map information storage unit 111 can be constructed in such a way that the storage medium for storing the initial map information and the storage medium to which unregistered road information is added to update the map information are separately disposed. In this case, the storage medium for storing the initial map information can be, for example, a non-rewritable one such as a DVD (Digital Versatile Device)-ROM. Furthermore, in the case in which the map information storage unit is constructed in such a way that the storage medium for storing the initial map information and the storage medium to which unregistered road information is added to update the map information are separately disposed, the storage medium to which unregistered road information is added to update the map information does not have to be nonvolatile. In this case, if the storage medium for storing the initial map information is rewritable, the map information processing apparatus can improve the convenience of data about an unregistered road, which have been added from a volatile storage medium to update the map information, by copying the data about the unregistered road to a nonvolatile storage medium before the data disappear from the volatile storage medium.

In above-mentioned Embodiment 1, the unregistered road traveling detecting unit 116 detects an unregistered road when the current position returns to an applicable road. The detection of an unregistered road can also be implemented by controlling the unregistered road traveling detecting unit 116 in such a way that the unregistered road traveling detecting unit detects the unregistered road by using the main controlling unit 119 when the user manipulates the wireless remote control or the like to provide a detection instruction and the user operation input acquiring unit 115 then receives this manipulation.

Furthermore, the road state sample shown in FIG. 2 is an example which is referred to in order to explain the operation of Embodiment 1 of the present invention, and the same operation can also be implemented even in a road state other than that of the sample shown in FIG. 2.

Embodiment 2

Figure 5:
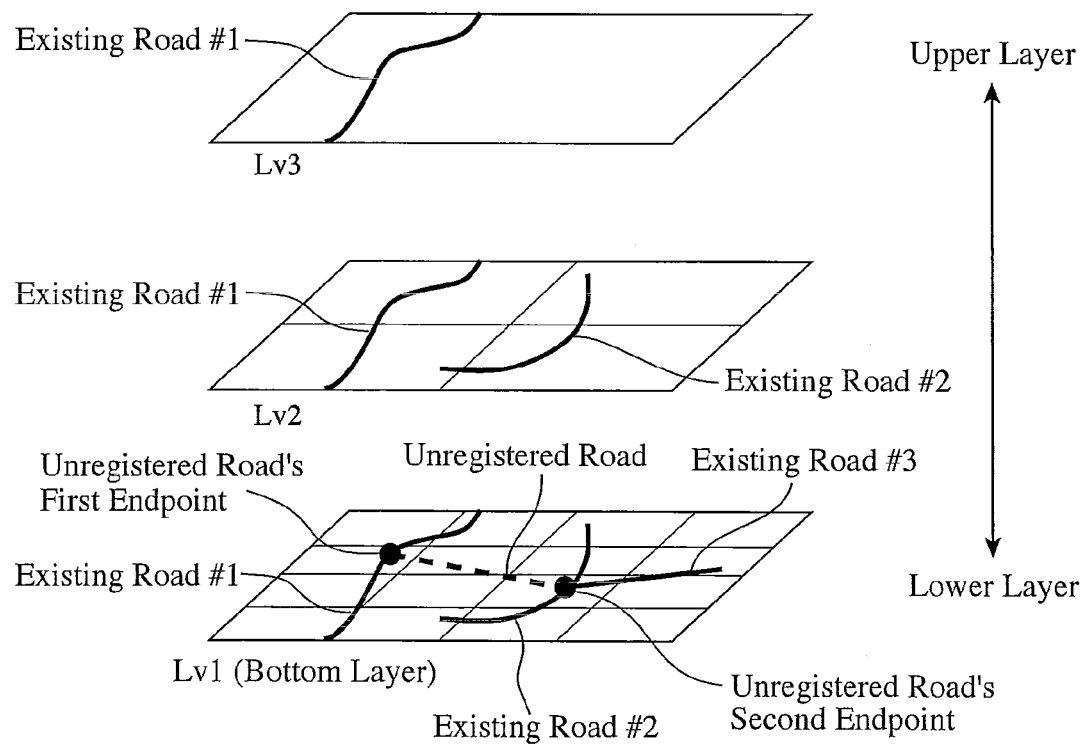
FIG. 5 is a view showing an example of a road state sample for use in a map information processing apparatus in accordance with Embodiment 2 of the present invention.

FIG. 5 is a view showing an example of a road state sample for use in a map information processing apparatus in accordance with Embodiment 2 of the present invention.

In Embodiment 2, the map information processing apparatus uses the same structure as the map information processing apparatus of Embodiment 1 shown by FIG. 1, and its operation is also the same at that of the map information processing apparatus of Embodiment 1 except for the description of the process of a layer-to-be-updated-with-addition determination processing unit 118. Hereafter, the operation of the map information processing apparatus in accordance with Embodiment 2 will be explained in detail with reference to the road state sample shown in FIG. 5, and flow charts shown in FIGS. 6 and 7 of the operation of the layer-to-be-updated-with-addition determination processing unit 118.

In the road state sample shown in FIG. 5, in Lv1 which is the bottom layer, pieces of information about three roads: an existing road #1, an existing road #2, and an existing road #3 are stored, as roads which are to be connected to an unregistered road, in a map information storage unit 111. Furthermore, the figure shows that the existing road #3 does not exist in Lv2 which is a layer higher than the bottom layer and the existing road #2 does not exist for Lv3 which is a further higher layer, and only the information about the existing road #1 is stored in the map information storage unit 111. In addition, each layer's map information is comprised of a plurality of meshes (in Lv3, only one mesh is shown).

The layer-to-be-updated-with-addition determination processing unit 118 determines, as an uppermost layer to be added, a layer which is the highest one of layers in which all of the existing road #1, the existing road #2, and the existing road #3, which are connected to the unregistered road, exist. More specifically, in the example shown in FIG. 5, layers in which all of the existing road #1, the existing road #2, and the existing road #3 exist are only Lv1. Therefore, in this case, the layer-to-be-updated-with-addition determination processing unit determines Lv1 as a layer to be additionally updated.

Figure 6:
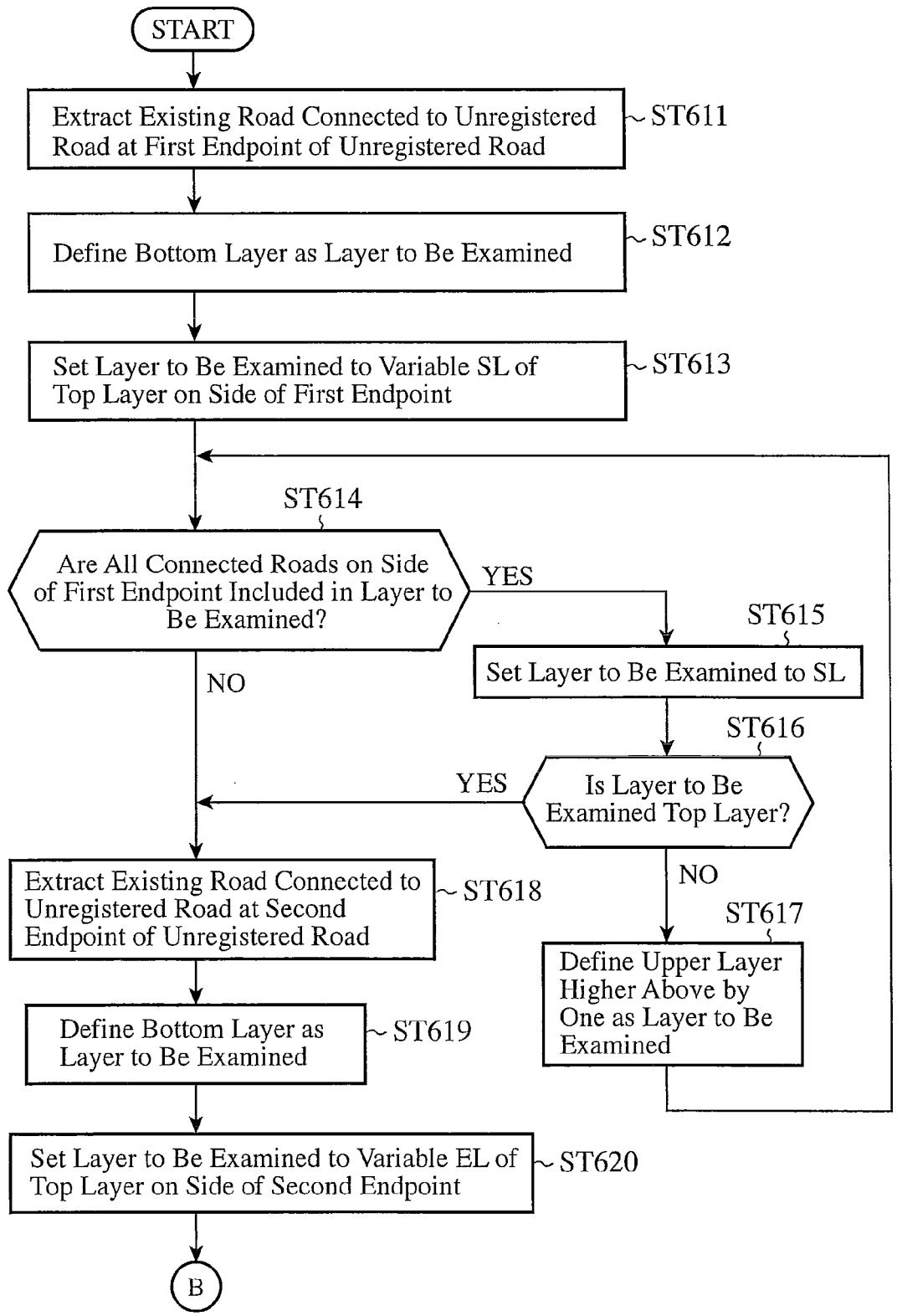
FIG. 6 is a flow chart which is referred to in order to explain the operation of the map information processing apparatus in accordance with Embodiment 2 of the present invention.
Figure 7:
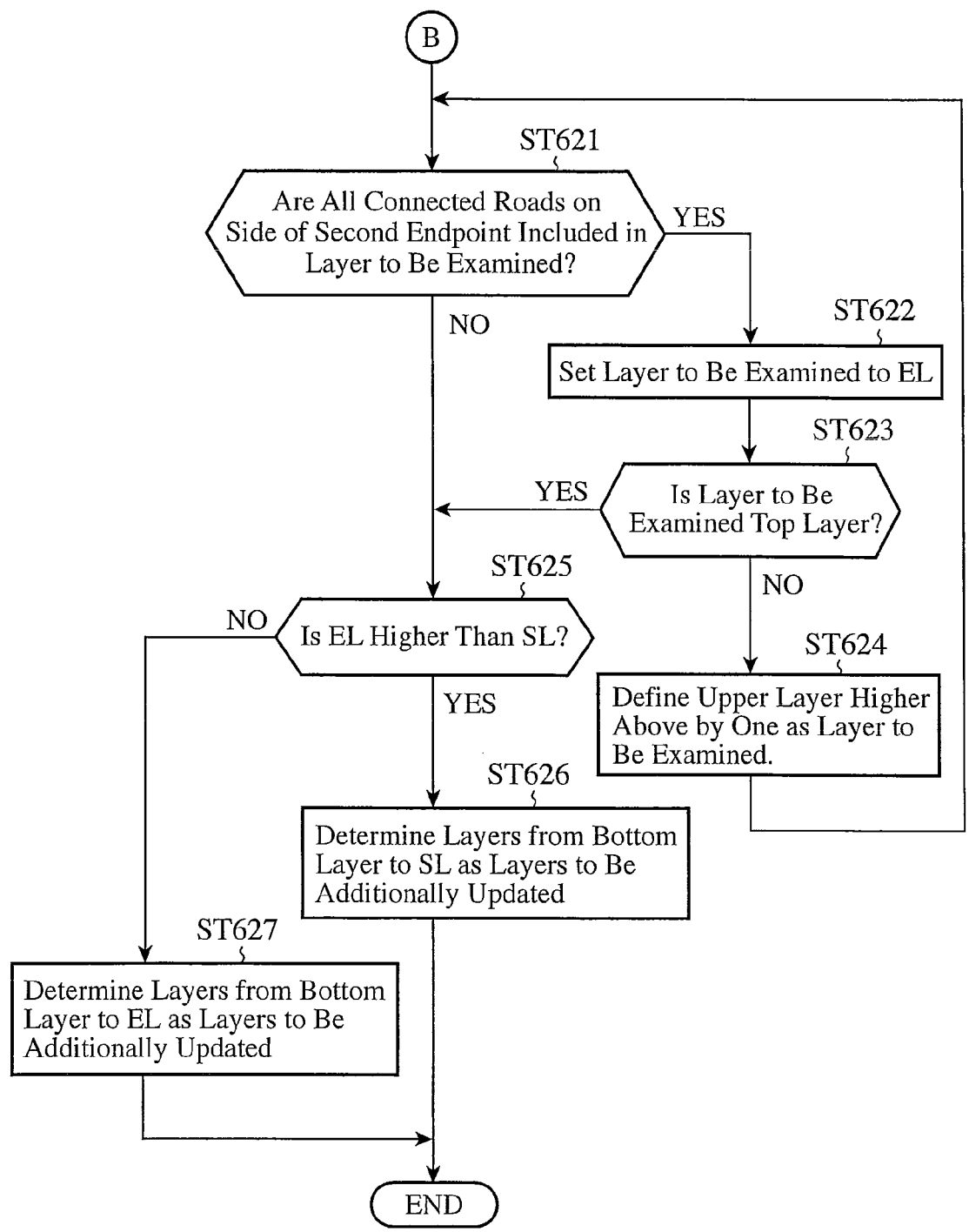
FIG. 7 is a flow chart which is referred to in order to explain the operation of the map information processing apparatus in accordance with Embodiment 2 of the present invention.

In the flow charts showing the operation of the layer-to-be-updated-with-addition determination processing unit 118 shown in FIGS. 6 and 7, the layer-to-be-updated-with-addition determination processing unit 118 extracts roads connected to the first endpoint of the unregistered road as first-endpoint-side connected roads from among roads (existing roads) whose information exist in the map information stored in the map information storage unit 111 first (step ST611 of FIG. 6).

The layer-to-be-updated-with-addition determination processing unit 118 then defines the bottom layer as the layer to be examined (step ST612), and sets this layer to be examined (the bottom layer) to a first endpoint side top layer variable SL (step ST613).

The layer-to-be-updated-with-addition determination processing unit then judges whether all of the first-endpoint-side connected roads extracted in step ST611 exist in the layer to be examined (step ST614). When, in the process of step ST614, judging that all the connected roads exist in the layer to be examined (when "Yes" in step ST614), the layer-to-be-updated-with-addition determination processing unit 118 sets the layer to be examined to the first endpoint side top layer variable SL (step ST615), and then judges whether or not the layer to be examined is the top layer (step ST616). When, in this step, judging that the object to be examined is not the top layer (when "No" in step ST616), the layer-to-be-updated-with-addition determination processing unit defines a layer one layer higher than the layer to be examined as a new layer to be examined (step ST617), and then returns to the process of step ST614.

In contrast, when judging that the object to be examined is the top layer (when "Yes" in step ST616), the layer-to-be-updated-with-addition determination processing unit ends the process about the side of the first endpoint. Also when, in the process of step ST614, judging that either one of all the connected roads does not exist in the layer to be examined (when "No" in step ST614), the layer-to-be-updated-with-addition determination processing unit ends the process about the first endpoint side.

After completing the process about the side of the first endpoint, the layer-to-be-updated-with-addition determination processing unit 118 carries out a process about the side of the second endpoint. The layer-to-be-updated-with-addition determination processing unit 118 extracts roads connected to the second endpoint of the unregistered road as second-endpoint-side connected roads from among the existing roads first (step ST618). The layer-to-be-updated-with-addition determination processing unit 118 then defines the bottom layer as the layer to be examined (step ST619), and sets this layer to be examined (bottom layer) to a second endpoint side top layer variable EL (step ST620).

Next, the layer-to-be-updated-with-addition determination processing unit 118 judges whether all of the second-endpoint-side connected roads extracted in step ST618 exist in the layer to be examined (step ST621 of FIG. 7).

When, in the process of step ST621, judging that all of the connected roads exist in the layer to be examined (when "Yes" in step ST621), the layer-to-be-updated-with-addition determination processing unit 118 sets the layer to be examined to the second endpoint side top layer variable EL (step ST622), and then judges whether or not the layer to be examined is the top layer (step ST623). When judging that the object to be examined is not the top layer (when "No" in step ST623), the layer-to-be-updated-with-addition determination processing unit 118 defines a layer one layer higher than the layer to be examined as a new layer to be examined (step ST624), and then returns to the process of step ST621. In contrast, when judging that the object to be examined is the top layer (when "Yes" in step ST623), the layer-to-be-updated-with-addition determination processing unit ends the process about the second endpoint side. Also when, in the process of step ST621, judging that either one of all the connected roads does not exist in the layer to be examined (when "No" in step ST621), the layer-to-be-updated-with-addition determination processing unit ends the process about the second endpoint side.

When completing the process about the side of the second endpoint, the layer-to-be-updated-with-addition determination processing unit 118 compares the first endpoint side top layer variable SL with the second endpoint side top layer variable EL (step ST625). When judging that EL is higher than SL (when "Yes" in step ST625), the layer-to-be-updated-with-addition determination processing unit 118 defines layers from the bottom layer to SL as the target to be added and then ends the process (step ST626).

In contrast, when, in the process of step ST625, judging that EL is not a layer higher than SL (when "No" in step ST625), the layer-to-be-updated-with-addition determination processing unit 118 defines layers from the bottom layer to EL as the target to be added and then ends the process (step ST627).

In accordance with above-mentioned Embodiment 2, the map information processing apparatus includes the layer-to-be-updated-with-addition determination processing unit 118 for determining one or more layers which are the target to be updated with addition of an unregistered road, and the unregistered road adding and updating unit 117 carries out an update of the map information with addition of the unregistered road to the map information storage unit 111 with an eye on the one or more layers determined by the layer-to-be-updated-with-addition determination processing unit 118, thereby updating each high level layer's map information with addition of the unregistered road to the map information. Therefore, the map information processing apparatus can use the unregistered road for display of a wide-area map and determination of a long distance route. Furthermore, because the map information processing apparatus carries out an update of each layer's map information in advance with addition of the unregistered road to the layer's map information which requires the addition, a navigation processing unit 112 can maintain its processing performance at the time of using the map information.

In addition, because the layer-to-be-updated-with-addition determination processing unit 118 determines, as layers to be additionally updated, layers including a layer in which there exists all roads to which the unregistered road is connected, and whose information is included in the map information stored in the map information storage unit 111, and lower level layers, the map information processing apparatus can use the unregistered road for an absolute minimum number of layers while improving its processing performance, thereby being able to provide the user with convenience.

The road state sample shown in FIG. 5 is an example which is referred to in order to explain the operation of the layer-to-be-updated-with-addition determination processing unit 118 in accordance with Embodiment 2, and the same operation can also be implemented even in a road state other than that of the sample shown in FIG. 5.

Embodiment 3

Figures 8, 10:
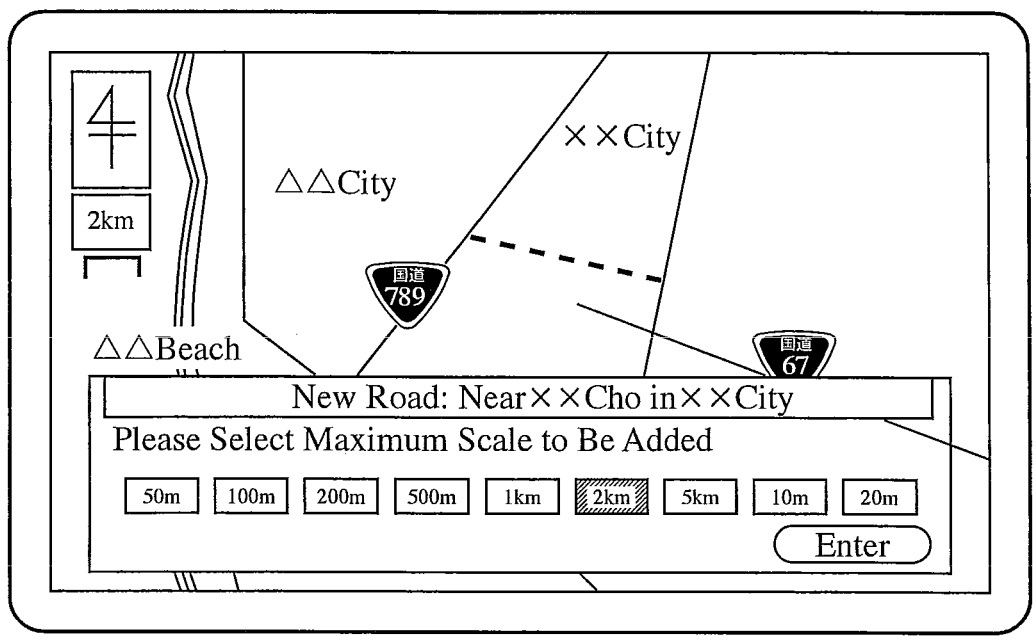
FIG. 8 is a view showing an example of the configuration of an input screen for use in a map information processing apparatus in accordance with Embodiment 3 of the present invention.
FIG. 10 is a view showing an example of the data structure of a conversion table for use in the map information processing apparatus in accordance with Embodiment 3 of the present invention and that in accordance with Embodiment 7.

FIG. 8 is a view showing an example of the configuration of an input screen which a map information processing apparatus in accordance with Embodiment 3 of the present invention uses.

The map information processing apparatus which is used in Embodiment 3 has the same structure as that in accordance with Embodiment 1 shown in FIG. 1, and only the descriptions of the processes carried out by a navigation processing unit 112, an unregistered road adding and updating unit 117, and a layer-to-be-updated-with-addition determination processing unit 118 differ from those of Embodiment 1. More specifically, the layer-to-be-updated-with-addition determination processing unit 118 acquires, via a user operation input acquiring unit 115, information about specification of layers with which the layer-to-be-updated-with-addition determination processing unit carries out an update with addition of an unregistered road, and determines layers to be set up as the target for additional update according to the information about the layer specification. Hereafter, the operation of the map information processing apparatus in accordance with Embodiment 3 of the present invention will be explained in detail.

First, the user specifies a layer to which he or she desires to add information about an unregistered road by performing an operation using a wireless remote control. At that time, the user specifies a layer on a screen having a graphical scale, such as a 100 m scale or a 2 km scale, as shown in, for example, an input screen of FIG. 8.

At that time, the user operation input acquiring unit 115 receives the above-mentioned user's manipulation via a remote control light receiving unit 14, and furnishes the information to the layer-to-be-updated-with-addition determination processing unit 118 via a main controlling unit 19. The layer-to-be-updated-with-addition determination processing unit 118 determines layers which are the target to be updated with addition according to the information about the layer to be updated with addition which is acquired via the user operation input acquiring unit 115 and which is specified by the user, and then reflects the determination of the layers in the map information storage unit 111. At that time, information about the layers which are the target to be updated with addition is stored as information relevant to the information about the unregistered road which is to be added to update the map information.

The unregistered road adding and updating unit 117 carries out additional registration of the information about the unregistered road to the map information storage unit 111 as information different from the initial map information. At that time, the unregistered road adding and updating unit specifies a mesh including the unregistered road for each layer which is the target to which the information about the unregistered road is to be added, and stores, as information relevant to the unregistered road, the mesh's ID (in a case in which the unregistered road extends over a plurality of meshes, all mesh IDs) in the map information storage unit 111, as well.

When the navigation processing unit 112 uses the map information stored in the map information storage unit 111, on the basis of the mesh ID of a layer which it uses, the navigation processing unit judges whether or not there exists an unregistered road in the mesh and, when there exists an unregistered road in the mesh, uses the unregistered road stored in the map information storage unit and the initial map information together.

Hereafter, the operation of the map information processing apparatus in accordance with Embodiment 3 of the present invention will be explained in detail with reference to a flow chart of the operation of the layer-to-be-updated-with-addition determination processing unit 118 shown in FIG. 9.

After displaying an input screen (FIG. 8) for urging the user to input information about a setup of a layer to be updated with addition on a display device 12 (step ST911), the layer-to-be-additionally-updated update determination processing unit 118 checks to see whether or not the map information processing apparatus has received information about an input about a setup of a layer to be updated with addition through the user's manipulation (step ST912). In this case, when the map information processing apparatus has not received any input done by the user (when "No" in step ST912), the layer-to-be-updated-with-addition determination processing unit waits for a predetermined time period, e.g. 0.5 seconds (step ST913). The layer-to-be-updated-with-addition determination processing unit 118 then judges whether a predetermined time period, e.g. 10 seconds has elapsed since the layer-to-be-updated-with-addition determination processing unit started this process (step ST914), and, when 10 seconds has not elapsed yet (when "No" in step ST914), returns to the process of step ST912. In contrast, when 10 seconds has elapsed (when "Yes" in step ST914), the layer-to-be-updated-with-addition determination processing unit determines only the bottom layer as a candidate for the layers to be updated with addition (step ST915), stores information about the layer which is the target to be updated with addition in the map information storage unit 111, and ends the process (step ST918).

In contrast, when the map information processing apparatus, in the process of step ST912, judges that it has received the user's operational input (when "Yes" in step ST912), the layer-to-be-updated-with-addition determination processing unit 118 determines a layer of the map information corresponding to the graphical scale inputted by the user (step ST916). At that time, the layer-to-be-updated-with-addition determination processing unit 118 refers to the scale and a table of conversion to a map information layer in which a correspondence between graphical scales and layers is defined, as shown in FIG. 10. This conversion table is held within a computer program which implements the layer-to-be-updated-with-addition determination processing unit 118.

Next, the layer-to-be-updated-with-addition determination processing unit 118 determines layers including from the bottom layer to the layer determined in step ST916 as the layers to be updated with addition (step ST917), and then shifts to the process of step ST918.

Figure 9:
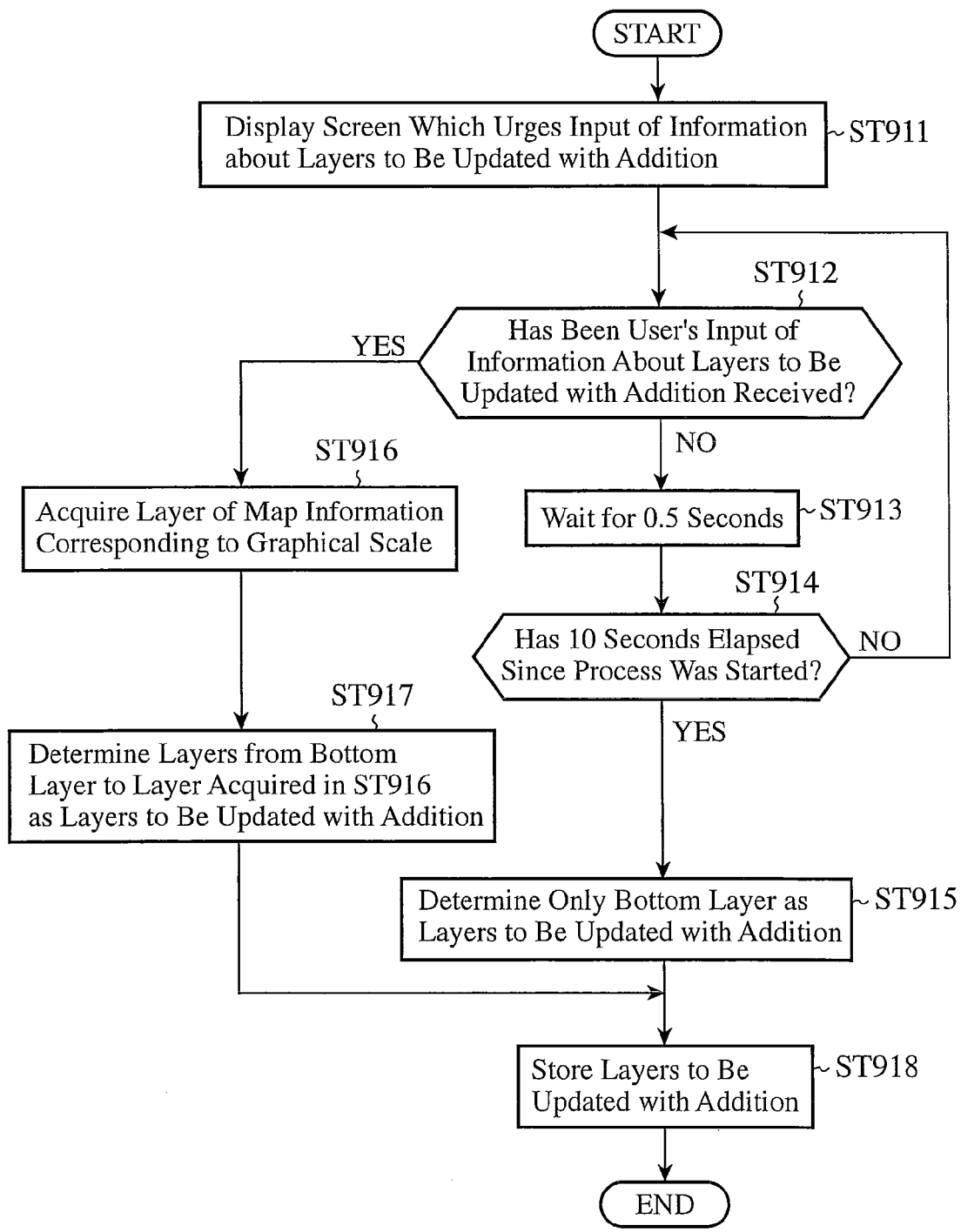
FIG. 9 is a flow chart which is referred to in order to explain the operation of the map information processing apparatus in accordance with Embodiment 3 of the present invention.

0.5 seconds in step ST913 and 10 seconds in step ST914, which are shown in the flow chart of FIG. 9 are examples of a time period during which to monitor the input waiting. The input waiting period is not restricted to either of these exemplary values, and the same effect can be produced even if any arbitrary value is set to the input waiting period according to the intention of the designer of the car navigation system 1.

The conversion table in which the correspondence between graphical scales and map information layers is defined, the conversion table being referred to, in step ST916, by the layer-to-be-updated-with-addition determination processing unit can be stored in advance in the map information storage unit 111, and the conversion can be implemented by the layer-to-be-updated-with-addition determination processing unit's referring to the table. As an alternative, instead of using the conversion table, every time when receiving the scale, the layer-to-be-updated-with-addition determination processing unit can perform a predetermined operation on the scale so as to determine a layer corresponding to the scale. Furthermore, when the user specifies a-layer which is the target to be updated with addition of the unregistered road, the map information processing apparatus can alternatively cause the user to make a specification of a representative fraction of, for example, $1/25,000$. In this case, the layer-to-be-updated-with-addition determination processing unit uses a conversion table showing conversion of the representative fraction to a map information layer instead of using the conversion table shown in FIG. 10.

When carrying out a programmed process, the navigation processing unit 112 refers to map information required for the process with reference to the map information storage unit 111. At that time, the navigation processing-unit acquires map information required for the process on the basis of an area and a layer required for the process. The navigation processing unit specifies the area with a mesh ID. The operation of acquiring the map information which is carried out by the navigation processing unit 112 is shown in FIG. 11 in the form of a flow chart.

Hereafter, the operation of the map information processing apparatus in accordance with Embodiment 3 of the present invention will be explained in detail with reference to the flow chart of the operation of the navigation processing unit 112 shown in FIG. 11.

Figure 11:
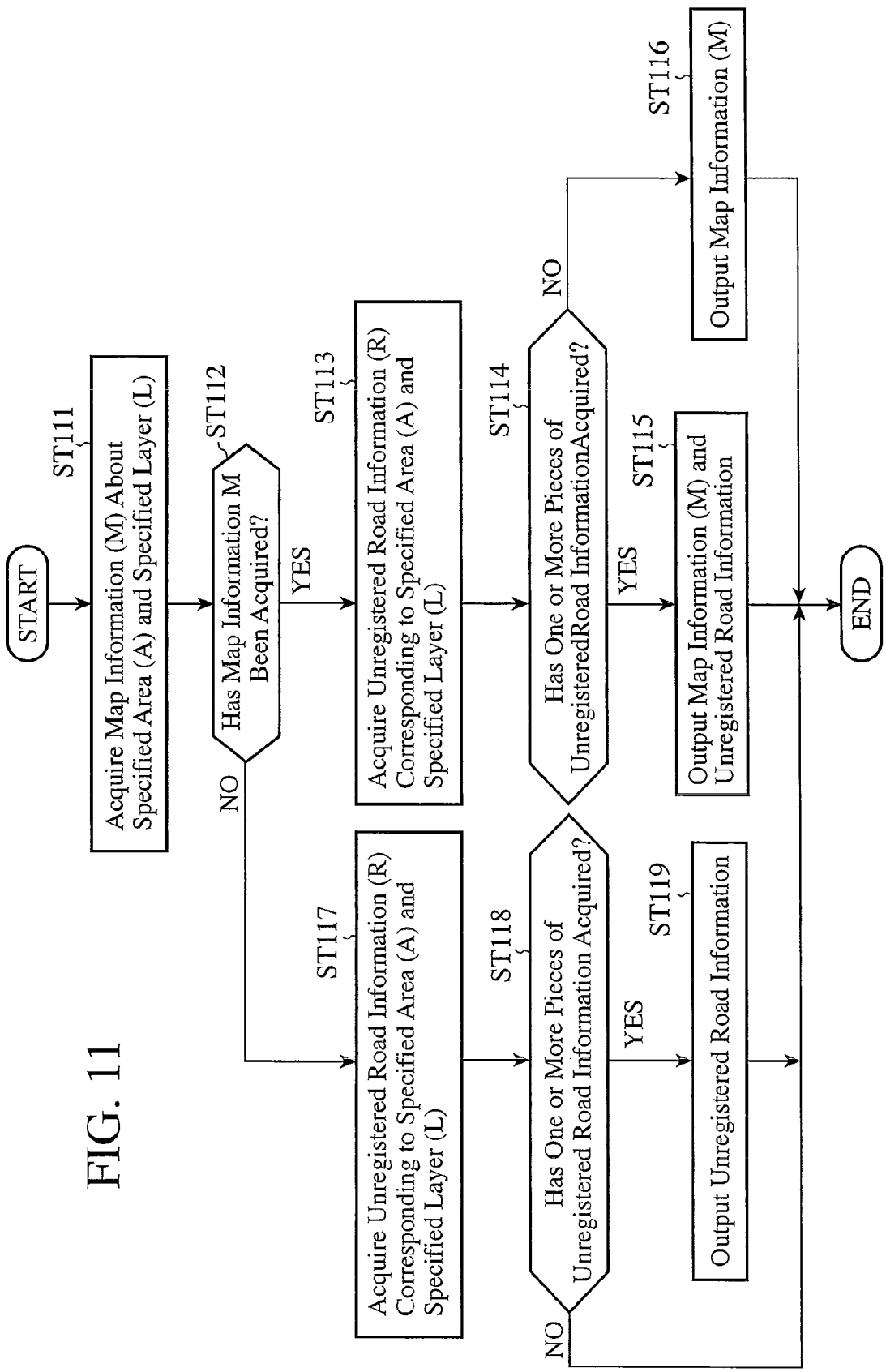
FIG. 11 is a flow chart which is referred to in order to explain the operation of the map information processing apparatus in accordance with Embodiment 3 of the present invention.

In FIG. 11, the navigation processing unit 112 acquires map information M corresponding to the specified area and the specified layer with reference to the map information storage unit 111 first (step ST111). At that time, the specified area A is determined with a mesh ID.

Next, the navigation processing unit 112 judges whether it has succeeded in acquiring the map information M (step ST112), and, when having succeeded in acquiring the map information (when "Yes" in step ST112), acquires the unregistered road information (R) corresponding to the specified area A and the specified layer L from the map information storage unit 111 (step ST113). The navigation processing unit 112 then judges whether it has succeeded in acquiring one or more pieces of unregistered road information (step ST114), and, when having succeeded in acquiring one or more pieces of unregistered road information (when "Yes" in step ST114), and outputs the map information M and the one or more pieces of unregistered road information to the display device 12 via the navigation result outputting unit 114 (step ST115). In contrast, when having failed in acquiring one or more pieces of unregistered road information (when "No" in step ST114), the navigation processing unit outputs only the map information M to the display device 12 via the navigation result outputting unit 114 (step ST116).

In contrast, when, in the process of step ST112, having failed in acquiring the map information M (when "No" in step ST112), the navigation processing unit 112 acquires unregistered road information (R) corresponding to the specified area A and the specified layer L from the map information storage unit 111 (step ST117). At that time, the navigation processing unit can determine the specified area with a mesh ID, like in the case of performing the above-mentioned process of step ST111.

The navigation processing unit 112 then judges whether it has succeeded in acquiring one or more pieces of unregistered road information (step ST118), and, when having succeeded in acquiring one or more pieces of unregistered road information (when "Yes" in step ST118), outputs the one or more pieces of unregistered road information to the display device 12 via the navigation result outputting unit 114 (step ST119). In contrast, when having failed in acquiring one or more pieces of unregistered road information (when "No" in step ST118), the navigation processing unit ends the process.

In accordance with above-mentioned Embodiment 3, the navigation processing unit 112 carries out navigation by using both the information about the unregistered road in the one or more layers determined by the layer-to-be-updated-with-addition determination processing unit 118 and the map information stored in the map information storage unit 111, but does not carry out any update with addition of the unregistered road information to the map information about the plurality of layers. Therefore, the map information processing apparatus can improve its processing performance at the time of adding the unregistered road information to the map information.

Furthermore, according to the user's specification, the user operation input acquiring unit 115 acquires information about the specification of layers which are to be updated with addition of the unregistered road, and then delivers the information to the layer-to-be-updated-with-addition determination processing unit 118, and the layer-to-be-updated-with-addition determination processing unit 118 determines layers to be set up as the target for additional update according to the information about the specification of the layers. Therefore, the map information processing apparatus can reflect the individual user's intention in the layers to be updated with addition, and the navigation processing unit 112 can use the unregistered road information in the plurality of layers in which the user's intention is reflected.

Embodiment 4

Figure 12:
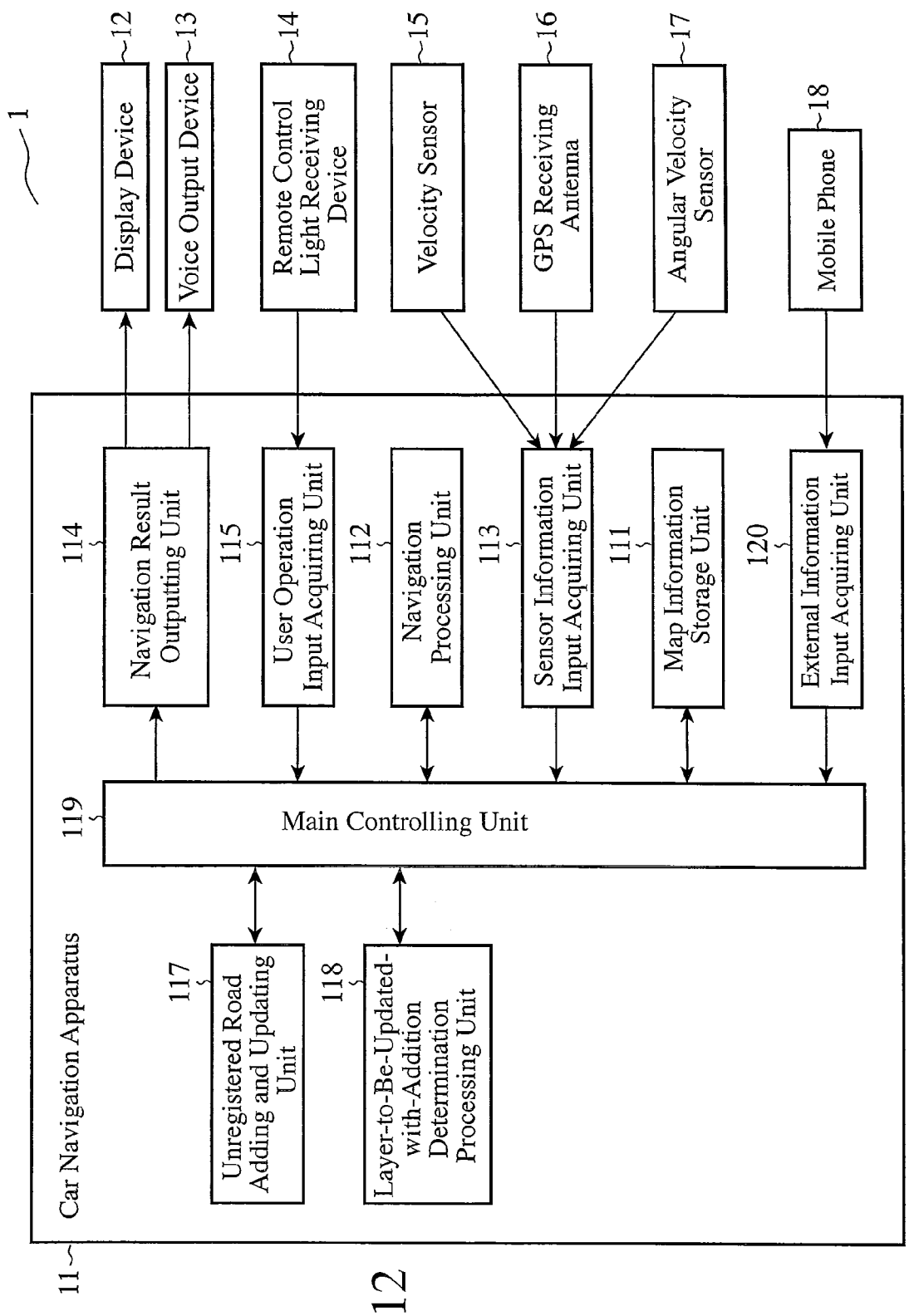
FIG. 12 is a block diagram showing the internal structure of a map information processing apparatus in accordance with Embodiment 4 of the present invention.

FIG. 12 is a block diagram showing the internal structure of a map information processing apparatus in accordance with Embodiment 4 of the present invention, and a car navigation system 1 is illustrated as an example of the map information processing apparatus, like in the case of Embodiment 1.

The difference between this Embodiment and Embodiment shown in FIG. 1 is that a navigation device 11 includes an external information input acquiring unit 120 to which a mobile phone 18 is connected. The descriptions of the processes carried out by an unregistered road adding and updating unit 117 and a layer-to-be-updated-with-addition determination processing unit 118 differ from those of Embodiment 1. Except for these descriptions, the structure and operation of the car navigation system in accordance with Embodiment 4 are the same as those of the car navigation system explained in Embodiment 1.

Hereafter, focusing on the difference in operation between Embodiment 4 and Embodiment 1, the operation of the map information processing apparatus in accordance with Embodiment 4 of the present invention will be explained.

The external information input acquiring unit 120 acquires both coordinate information about the coordinates of an unregistered road, and information about layers which are to be updated with addition of this unregistered road via the mobile phone 18. Data showing the top one of the layers to be updated with addition of the unregistered road are included in the information about the layers to be updated with addition.

On the basis of the information about the unregistered road which the unregistered road adding and updating unit has acquired via the external information input acquiring unit 120, the unregistered road adding and updating unit 117 carries out an update with addition of the road information to a map information storage unit 111. The process of updating the layers determined by the layer-to-be-updated-with-addition determination processing unit 118 with addition of the road information is the same as that of Embodiment 1.

Figure 13:
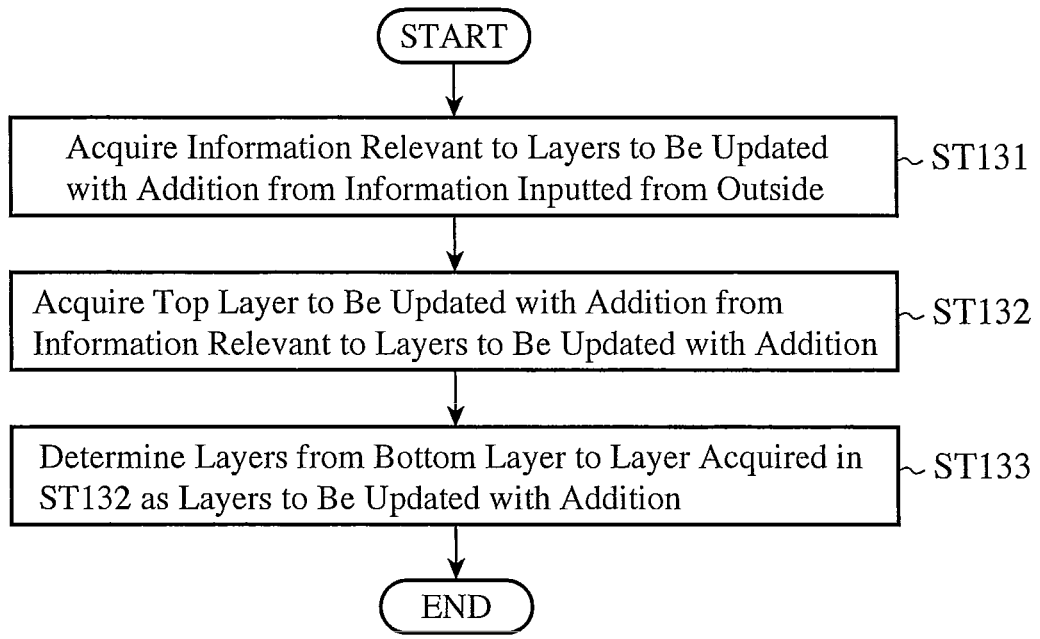
FIG. 13 is a flow chart which is referred to in order to explain the operation of the map information processing apparatus in accordance with Embodiment 4 of the present invention.

Hereafter, the operation of the map information processing apparatus in accordance with Embodiment 4 of the present invention will be explained in detail with reference to a flow chart shown in FIG. 13 of the operation of the layer-to-be-updated-with-addition determination processing unit 118.

The layer-to-be-updated-with-addition determination processing unit 118 refers to the information about the layers to be updated with addition which it has acquired via the external information input acquiring unit 120 first (step ST131), and determines the top one of the layers to be updated with addition (step ST132).

The layer-to-be-updated-with-addition determination processing unit 118 then determines, as candidates for the layers to be updated with addition, the layers from the bottom layer to the layer determined in step ST131 (step ST133).

In accordance with above-mentioned Embodiment 4, the layer-to-be-updated-with-addition determination processing unit 11 acquires road information about a road whose information does not exist in the map information from outside the map information processing apparatus and determines one or more layers to be updated with addition of the unregistered road on the basis of the road information, so that the navigation processing unit 112 can use the unregistered road in the determined layers. Therefore, by updating each high level layer's map information with addition of the unregistered road to the map information, the map information processing apparatus can use the unregistered road for display of a wide-area map and determination of a long distance route. Furthermore, at that time, because the map information processing apparatus does not add any new road information to the map information of each of the plurality of layers, the map information processing apparatus can improve its processing performance at the time of carrying out an update with addition of the unregistered road as map information.

The road information acquired by the external information input acquiring unit 120 includes the information about the layers to be updated with addition, and, according to the information about the layers to be updated with addition which the layer-to-be-updated-with-addition determination processing unit 118 has acquired via the external information input acquiring unit 120, the layer-to-be-updated-with-addition determination processing unit determines layers to be updated with addition. Therefore, the navigation system 1 can use the unregistered road in the appropriate layers which are specified beforehand in the exterior of the navigation system 1.

In above-mentioned Embodiment 4, the information about the layers to be updated with addition which the external information input acquiring unit 120 can acquire together with the information about the unregistered road is the one directly concerning the layers to be updated with addition. As an alternative, the information about the layers to be updated with addition can be either information showing a graphical scale or information showing a representative fraction. At that time, the layer-to-be-updated-with-addition determination processing unit 118 holds in advance a conversion table as shown in Embodiment 3, and then refers to it.

Furthermore, in above-mentioned Embodiment 4, the layer-to-be-updated-with-addition determination processing unit acquires the information about the layers to be updated with addition, as well as the information about the unregistered road, via the external information input acquiring unit 120. As an alternative, the layer-to-be-updated-with-addition determination processing unit can acquire only the unregistered road information via the external information input acquiring unit 120, and can determine the layers to be updated with addition according to the layer-to-be-updated-with-addition determining process method as explained in Embodiments 1, 2 and 3. Furthermore, the navigation system can be constructed in such a way as to acquire other information attached to the unregistered road, including, for example, traffic regulations, the width of the road, etc., in addition to the coordinate information about the coordinates of the unregistered road acquired by the external information input acquiring unit 120. At that time, the unregistered road adding and updating unit 117 has to store these pieces of attached information as well in the map information storage unit 111.

In above-mentioned Embodiment 4, the external information input acquiring unit 120 acquires the information from outside the car navigation system by using the mobile phone 18. As an alternative, the external information input acquiring unit can acquire the unregistered road information via broadcasting. In this case, the external information input acquiring unit 120 is constructed in such a way as to be connected with a broadcast receive antenna. The external information input acquiring unit can alternatively acquire the unregistered road information via DSRC (Dedicated Short Range Communication). In this case, the external information input acquiring unit 120 is constructed in such a way as to be connected with a DSRC antenna.

The external information input acquiring unit can alternatively acquire the unregistered road information by using a nonvolatile storage medium (a CD-ROM, a CD-R, a semiconductor recording medium, or the like) in which the information is recorded in advance. In this case, the external information input acquiring unit 120 is constructed in such a way as to be connected with a reader for reading a storage medium. Furthermore, the reader can be constructed in such a way as to be included within the car navigation apparatus 1. As an alternative, the external information input acquiring unit can acquire the unregistered road information by using an arbitrary method other than these methods. In this case, the external information input acquiring unit 120 is constructed in such a way as to be connected with an appropriate information receiving device.

Embodiment 5

Figure 14:
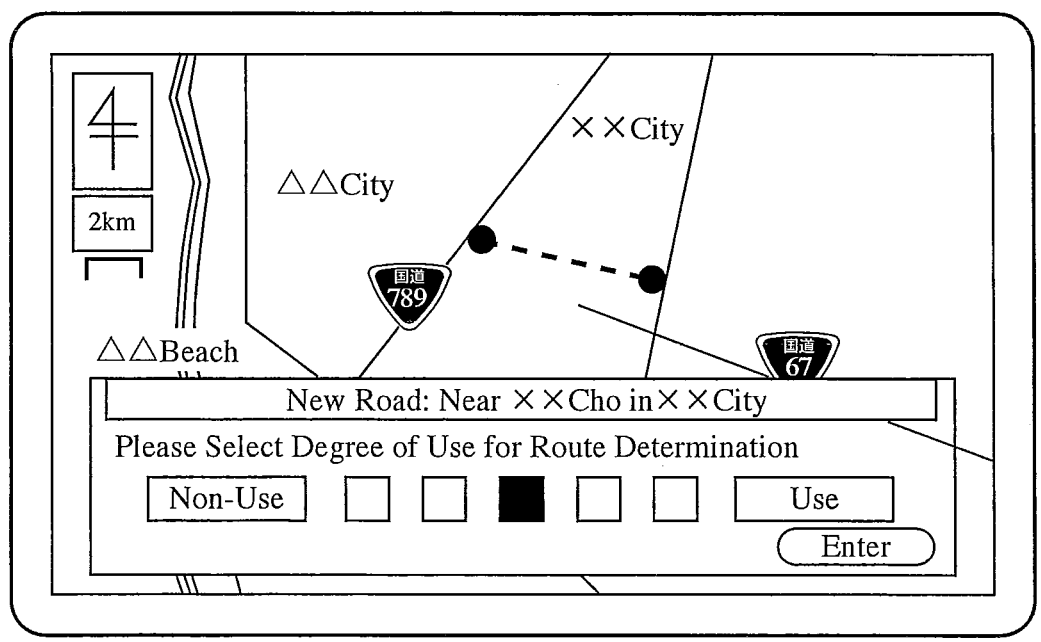
FIG. 14 is a view showing an example of the configuration of an input screen for use in a map information processing apparatus in accordance with Embodiment 5 of the present invention.

FIG. 14 is a view showing an example of the configuration of an input screen which a map information processing apparatus in accordance with Embodiment 5 of the present invention uses.

The map information processing apparatus used in Embodiment 5 has the same structure as that of Embodiment 4 shown in FIG. 12, while only the description of the process carried out by a layer-to-be-updated-with-addition determination processing unit 118 differs slightly from that of Embodiment 4. The layer-to-be-updated-with-addition determination processing unit 118 determines layers which are to be updated with addition of unregistered road map information to a map information storage unit 111 according to information about a degree of use of the unregistered road for route determination, which is inputted through the user's manipulation of the input device such as a wireless remote control. Hereafter, the operation of the map information processing apparatus in accordance with Embodiment 5 of the present invention will be explained in detail.

First, the user specifies the degree of use of the unregistered road with which he or she desires to use the unregistered road for route determination by manipulating the wireless remote control. At that time, as shown in the input screen of FIG. 14, the degree of use of the unregistered road is divided into multiple levels including from "nonuse" to "use" and, the degree of use of the unregistered road is specified to make the user select one of them.

A user operation input acquiring unit 115 receives the above-mentioned user's manipulation via a remote control light receiving unit 14, and furnishes the information to the layer-to-be-updated-with-addition determination processing unit 118 via a main controlling unit 19. The layer-to-be-updated-with-addition determination processing unit 118 determines layers to be updated with addition according to the information about the layers to be updated with addition which are specified by the user, the information being acquired from a user operation input acquiring unit 15, and reflects the layers to be updated with addition in the map information storage unit 111. At that time, the layer-to-be-updated-with-addition determination processing unit stores the information about the layers to be updated with addition in the map information storage unit 111 as information relevant to the information about the unregistered road which is added to update the road information.

An unregistered road adding and updating unit 117 carries out additional registration of the information about the unregistered road to the map information storage unit 111 as information different from the initial map information. At that time, the unregistered road adding and updating unit specifies a mesh including the unregistered road for each layer which is the target to which the information about the unregistered road is to be added, and stores, as information relevant to the unregistered road, the mesh's ID (in a case in which the unregistered road extends over a plurality of meshes, all mesh IDs) in the map information storage unit 111, as well.

On the other hand, when the navigation processing unit 112 uses the map information stored in the map information storage unit 111, on the basis of the mesh ID of a layer which it uses, the navigation processing unit judges whether or not there exists an unregistered road in the mesh and, when there exists an unregistered road in the mesh, uses the unregistered road stored in the map information storage unit and the initial map information together.

Hereafter, the operation of the map information processing apparatus in accordance with Embodiment 5 will be explained in detail with reference to a flow chart of the operation of the layer-to-be-set-up determination processing unit 118 shown in FIG. 15.

Figure 15:
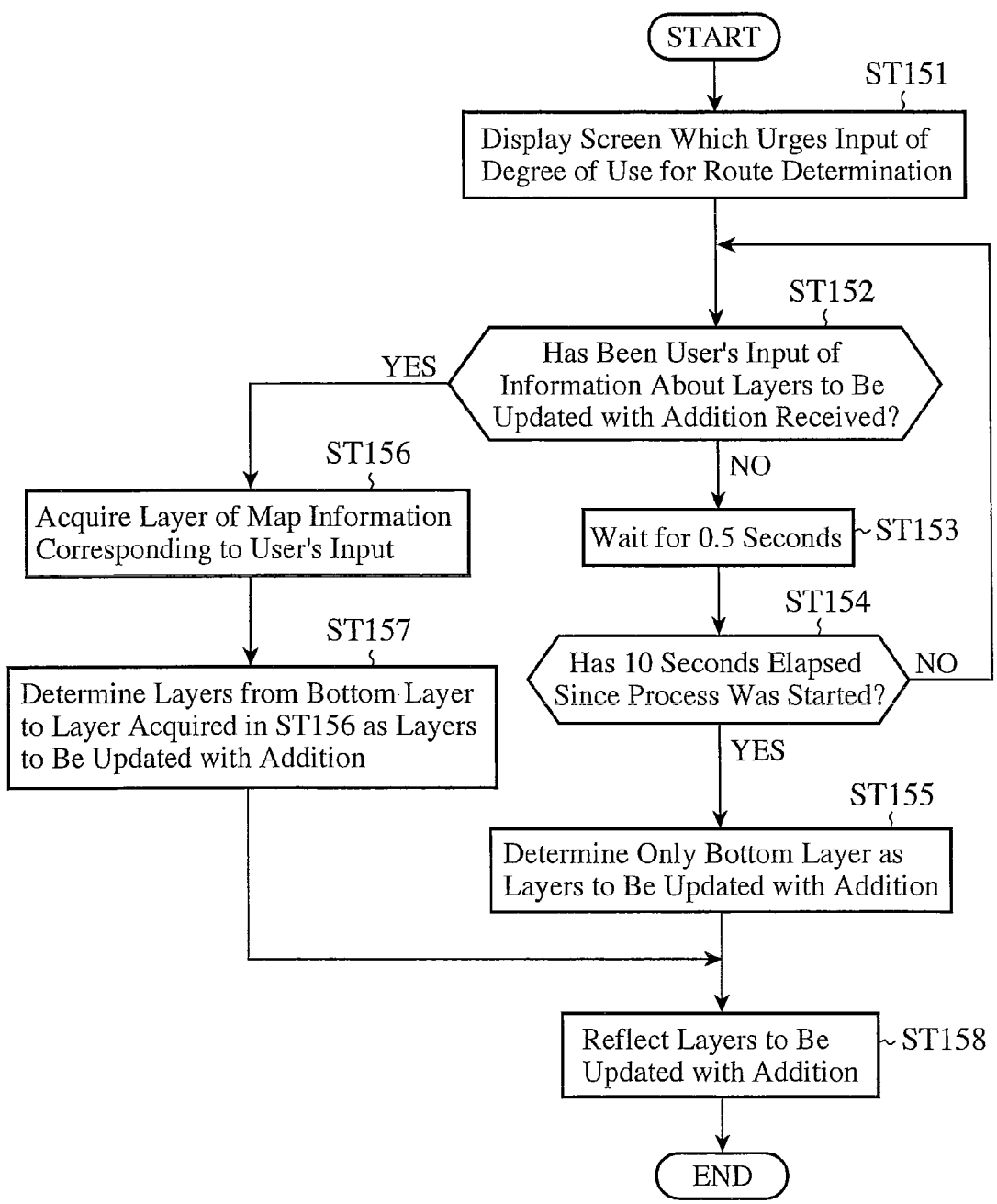
FIG. 15 is a flow chart which is referred to in order to explain the operation of the map information processing apparatus in accordance with Embodiment 5 of the present invention.

In the operation flow chart of FIG. 15, after displaying the input screen with which to urge the user input information about the degree of use for route determination first (step ST151), the layer-to-be-updated-with-addition determination processing unit 118 judges whether the map information processing apparatus has received information about an input of the degree of use for route determination through the user's manipulation (step ST152).

In this case, when the map information processing apparatus has not received any input done by the user (when "No" in step ST152), the layer-to-be-set-up determination processing unit 118 further waits for 0.5 seconds (step ST153). The layer-to-be-set-up determination processing unit 118 then judges whether ID seconds has elapsed since the additional setup layer determination processing unit started this process (step ST154), and, when 10 seconds has not elapsed yet (when "No" in step ST154), returns to the process of step ST152. In contrast, when 10 seconds has elapsed (when "Yes" in step ST154), the layer-to-be-set-up determination processing unit 118 determines only the bottom layer as a candidate for the layers to be updated with addition (step ST155), stores information about the layer which is the target to be updated with addition in the map information storage unit 111, and ends the process (step ST158).

In contrast, when the map information processing apparatus, in the process of step ST152, judges that it has received the user's operational input (when "Yes" in step ST152), the layer-to-be-set-up determination processing unit 118 determines a layer of the map information corresponding to the degree of use for route determination which is inputted by the user (step ST156). At that time, the layer-to-be-set-up determination processing unit 118 refers to a conversion table in which a correspondence between degrees of use for route determination and map information layers is defined, as shown in FIG. 16. This conversion table is held within a computer program which implements the layer-to-be-updated-with-addition determination processing unit 118.

Next, the layer-to-be-updated-with-addition determination processing unit 118 determines layers including from the bottom layer to the layer determined in step ST156 as the layers to be updated with addition (step ST157), and then shifts to the process of step ST158.

In accordance with above-mentioned Embodiment 5, the layer-to-be-updated-with-addition determination processing unit 118 acquires the degree of use of the unregistered road with which the user desires to use the unregistered road for route determination via the user operation input acquiring unit 115, and determines layers to be set up as the target for additional update on the basis of this degree of use for route to determination, so that the navigation processing unit 112 can use the unregistered road for the layer optimal from the viewpoint of route determination.

0.5 seconds in step ST153 and 10 seconds in step ST154, which are shown in the flow chart of FIG. 15, are examples of a time period during which the layer-to-be-updated-with-addition determination processing unit waits the input. The input waiting period is not restricted to either of these exemplary values, and the same effect can be produced even if any arbitrary value is set to the input waiting period according to the intention of the designer of the car navigation system 1.

Furthermore, the conversion table in which the correspondence between degrees of use for route determination and map information layers is defined, the conversion table being referred to, in step ST156, by the layer-to-be-updated-with-addition determination processing unit, can be stored in advance in the map information storage unit 111, and the conversion can be implemented by the layer-to-be-updated-with-addition determination processing unit's referring to the table. As an alternative, every time when the degree of use for route determination is inputted, the layer-to-be-updated-with-addition determination processing unit can perform an operation on the degree of use for route determination so as to determine the layers to be updated. Furthermore, in the screen displayed in step ST151 which urges the user to specify the degree of use of the unregistered road for route determination, the conversion can be alternatively implemented by causing the user to select either a purpose of "short di stance route determination" or a purpose of "long distance route determination."

Embodiment 6

A map information processing apparatus in accordance with Embodiment 6 employs the same internal structure as that of the map information processing apparatus in accordance with Embodiment 1 shown in FIG. 1, while only the description of the process carried out by a layer-to-be-updated-with-addition determination processing unit 118 differs from that of Embodiment 1. In this case, the layer-to-be-updated-with-addition determination processing unit 118 calculates a distance of an unregistered road and determines a layer corresponding to the distance by referring to a conversion table on the basis of the calculated distance, or by performing a calculating operation, and then defines layers including from the bottom layer to the layer which is determined as mentioned above as the target to be updated with addition.

Hereafter, the operation of the map information processing apparatus in accordance with Embodiment 6 of the present invention will be explained in detail with reference to a flow chart of the operation of the layer-to-be-updated-with-addition determination processing unit 118 shown in FIG. 17.

The layer-to-be-updated-with-addition determination processing unit 118 calculates the distance of the unregistered road first (step ST171). Next, the layer-to-be-updated-with-addition determination processing unit refers to the conversion table shown in FIG. 18 in which a correspondence between distances and layers to be set up as the target for additional update is defined, and determines a layer of the map information corresponding to the distance of the unregistered road calculated in step ST171 (step ST172). This conversion table is held within a computer program which implements the layer-to-be-set-up determination processing unit 118.

Next, the layer-to-be-updated-with-addition determination processing unit 118 determines layers including from the bottom layer to the layer determined in step ST172 as the layers to be updated with addition and then ends the process (step ST173).

In accordance with above-mentioned Embodiment 6, because the layer-to-be-updated-with-addition determination processing unit 118 determines the layers to be updated with addition from the distance of the unregistered road, the navigation processing unit 112 can produce a map display in an appropriate layer of the unregistered road, and can implement a route determination in the appropriate layer.

The conversion table in which the correspondence between distances and map information layers is defined, the conversion table being referred to, in step ST172, by the layer-to-be-updated-with-addition determination processing unit, can be stored in advance in the map information storage unit 111, and the conversion can be implemented by the layer-to-be-updated-with-addition determination processing unit's referring to the table. As an alternative, every time when the distance is calculated, the layer-to-be-updated-with-addition determination processing unit can perform an operation on the distance so as to determine the layers to be updated.

Embodiment 7

Figure 19:
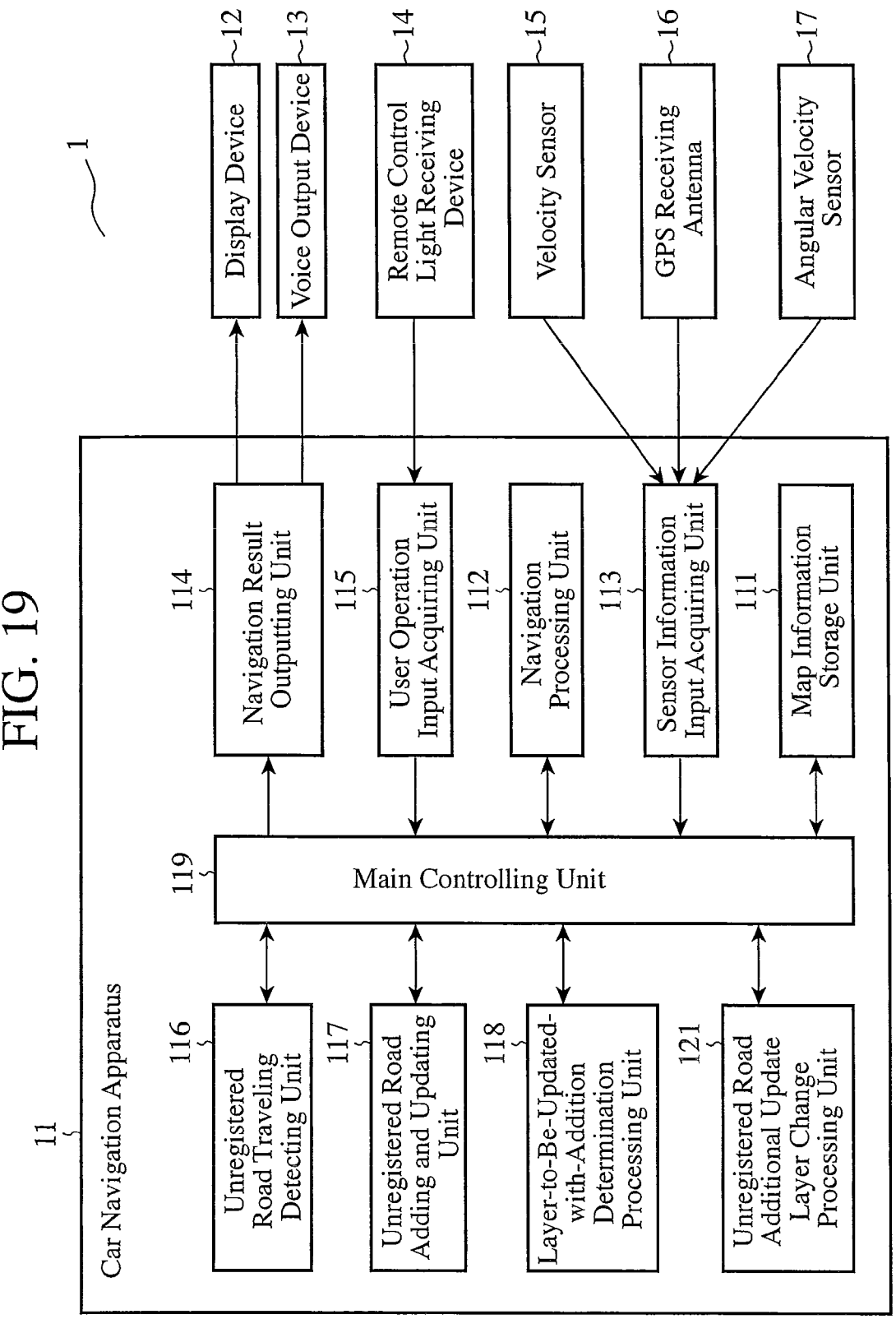
FIG. 19 is a block diagram showing the internal structure of a map information processing apparatus in accordance with Embodiment 7 of the present invention.

FIG. 19 is a block diagram showing the internal structure of a map information processing apparatus in accordance with Embodiment 7 of the present invention. Also in this embodiment, a car navigation system 1 is illustrated as an example of the map information processing apparatus, like in the case of Embodiment 1. The car navigation system differs from that of Embodiment 1 in that it has an unregistered road additional setup layer change processing unit 121.

However, the car navigation system of this Embodiment is constructed in the same way as that of Embodiment 1 in that an unregistered road traveling detecting unit 116 detects the vehicle's traveling along a road whose information does not exist in the map information stored in a map information storage unit 111 while calculating map information to be stored in the map information storage unit 111 on the basis of signals from various sensors, a layer-to-be-set-up determination processing unit 118 determines layers of the map information which are to be updated with addition of the unregistered road on the basis of the detection result, and an unregistered road information additional updating unit 117 carries out an update with addition of the unregistered road information to the map information storage unit 111 on the basis of the determined layers. The operation of the car navigation system of this Embodiment differs from that of Embodiment 1 in that the car navigation system can change the layers to be updated with addition of the unregistered road, which have been updated with addition, at a later time. Hereafter, the operation of changing the layers which are set up as the target for additional update will be explained with reference to FIGS. 19 to 21 and FIG. 10.

When the user selects a menu for changing the layers to be set up as the target for update with addition of the unregistered road with a menu selection screen (not shown) in a state in which the information about the unregistered road is stored in the map information storage unit 111, a selection screen (not shown) for selecting an unregistered road to be changed from unregistered roads already added is displayed, and the user looks at this selection screen and selects an unregistered road which he or she desires to change.

When an unregistered road is selected, a main controlling unit 119 changes the layers to be set up as the target for update with addition of the unregistered road according to the unregistered road additional setup layer change processing unit 121. Hereafter, the operation of the unregistered road additional setup layer change processing unit 121 will be explained by using a flow chart shown in FIG. 20.

Figures 18, 21:
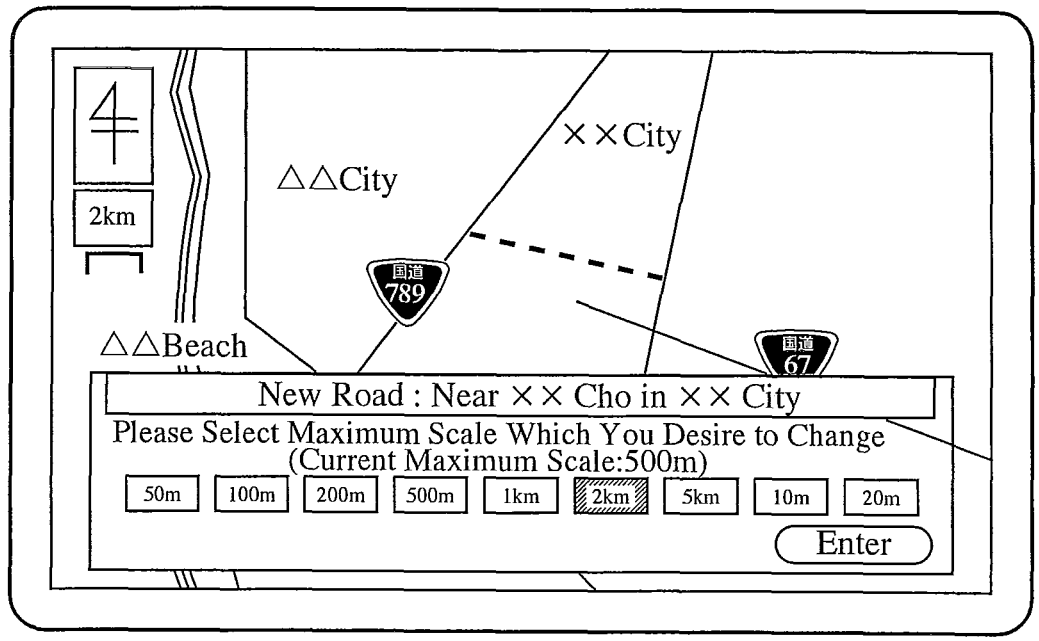
FIG. 18 is a view showing an example of the data structure of a conversion table for use in the map information processing apparatus in accordance with Embodiment 6 of the present invention.
FIG. 21 is a view showing an example of the configuration of an input screen for use in the map information processing apparatus in accordance with Embodiment 7 of the present invention.

In FIG. 20, after displaying a screen which urges the user to make an input of an additional graphical scale after occurrence of a change in the selected unregistered road on a display device 12 (step ST201), the unregistered road additional setup layer change processing unit 121 judges whether or not the car navigation system has received an input of information about specification of an additional graphical scale after occurrence of a change in the selected unregistered road through the user's manipulation (step ST202). An example of the screen which is displayed in step ST201 and which urges the user to make an input of an additional graphical scale after occurrence of a change in the selected unregistered road is shown in FIG. 21. According to the screen configuration of FIG. 21, a graphical scale after addition of an unregistered road shown by a dotted line is inputted.

When, in the process of step ST202, judging that the car navigation system has not received the user's input of information about specification of an additional graphical scale (when "No" in step ST202), the unregistered road additional setup layer change processing unit 121 further waits for 0.5 seconds (step ST203). The unregistered road additional setup layer change processing unit then judges whether 10 seconds has elapsed since the unregistered road additional setup layer change processing unit started this process (step ST204), and, when 10 seconds has not elapsed yet (when "No" in step ST204), returns to the process of step ST202. In contrast, when 10 seconds has elapsed (when "Yes" in step ST204), the unregistered road additional setup layer change processing unit judges that there is no change in the layers to be additionally updated and then ends the process (step ST205).

When, in the process of step ST202, judging that the car navigation system has received the user's input of information about specification of an additional graphical scale (when "Yes" in step ST202), the unregistered road additional setup layer change processing unit 121 acquires, via the user operation input acquiring unit 115 and the main controlling unit 119, the graphical scale which the user has inputted after occurrence of a change in the selected unregistered road, and determines the map information layer IL corresponding to the display scale (step ST206). At that time, the unregistered road additional setup layer change processing unit 121 refers to a conversion table as shown in FIG. 10 in which a correspondence between display scales and map information layers is defined (in the same way that that in accordance with Embodiment 3 does). This conversion table is held within a computer program which implements the unregistered road additional setup layer change processing unit 121.

Next, the unregistered road additional setup layer change processing unit 121 compares the number CL showing the current top one of the layers which are the target to be updated with addition of the unregistered road with the number IL showing the map information layer. In this case, the unregistered road additional setup layer change processing unit judges whether or not IL is larger than CL (step ST207), and, when judging that IL is larger than CL (when "Yes" in step ST207), the unregistered road additional setup layer change processing unit 121 determines the layers including from the layer CL+1 to the layer IL as the layers to be updated with addition (step ST208), and adds the information about the unregistered road to the map information about each of the layers which is stored in the map information storage unit 111 (step ST209).

When, in the process of step ST209, judging that the number IL showing the map information layer is not larger than the number CL showing the top one of the layers which are the target to be updates with addition of the unregistered road (when "No" in step ST207), the unregistered road additional setup layer change processing unit 121 further judges whether or not IL is smaller than CL (step ST210), and, when judging that IL is smaller than CL (when "Yes" in step ST209), determines the layers including from the layer IL+1 to the layer CL as the layers to be updated with deletion (S211) and then deletes the information about the unregistered road from the map information about each of the layers which is stored in the map information storage unit 111 (step ST212).

When, in the process of step ST210, judging that IL is not smaller than CL (when "No" in step ST210), the unregistered road additional setup layer change processing unit 121 ends the process because IL and CL are equal to each other.

In accordance with above-mentioned Embodiment 7, because the unregistered road additional setup layer change processing unit 121 which changes the layers to be set up as the target for update with addition of an unregistered road stored in the map information storage unit 111 can the layers to be updated with addition of an unregistered road which have been updated with addition, the car navigation system makes it possible to carry out navigation with high flexibility and high versatility.

Furthermore, because the unregistered road additional setup layer change processing unit 121 changes the layers to be updated with addition of an unregistered road stored in the map information storage unit 111 according to the user's operational input (the information about specification of the layers) which is acquired by the user operation input acquiring unit 115, the unregistered road additional setup layer change processing unit can change the layers in which the navigation system uses unregistered road information according to the individual user's intention.

0.5 seconds in step ST203 and 10 seconds in step ST204 are examples of a time period during which the unregistered road additional setup layer change processing unit waits the input. The same advantage can be provided even if another appropriate value is set to the input waiting period. Furthermore, the unregistered road additional setup layer change processing unit can alternatively return to the process of step ST202 without making the judgment of step ST204. In this case, the unregistered road additional setup layer change processing unit performs the operation without imposing any time limit on the user's input.

Embodiment 8

Figure 22:
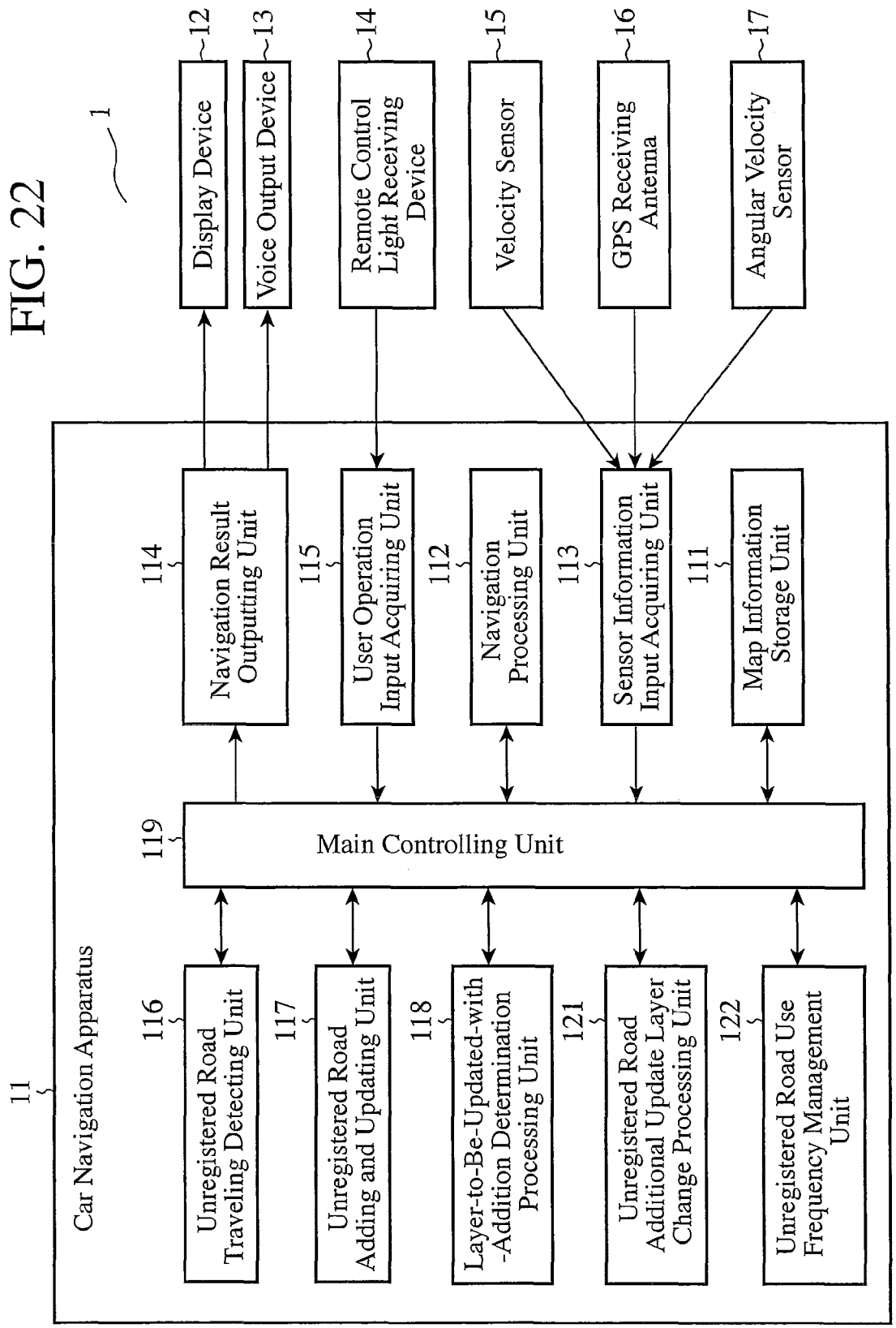
FIG. 22 is a block diagram showing the internal structure of a map information processing apparatus in accordance with Embodiment 8 of the present invention.

FIG. 22 is a block diagram showing the internal structure of a map information processing apparatus in accordance with Embodiment 8 of the present invention. Also in this Embodiment, a navigation system is illustrated as an example of the map information processing apparatus, like in the case of Embodiment 7. The navigation system differs from that of Embodiment 7 in that it is provided with an unregistered road use frequency management unit 122. The other structural components of the navigation system are the same as those of Embodiment 1.

Hereafter, the operation of changing the layers which are to be updated with addition of an unregistered road by using the unregistered road use frequency management unit 122 will be explained in detail with reference to FIGS. 22 to 25.

In the car navigation apparatus 11 in accordance with Embodiment 8, when an unregistered road adding and updating unit 117 stores information about an unregistered road in a map information storage unit 111, the car navigation system also stores management information (not shown) about the unregistered road in the map information storage unit 111 simultaneously. The management information about the unregistered road includes information showing the number of times that the unregistered road has been used, as well as the address of the unregistered road and the date and time at which the information about the unregistered road was created. These pieces of management information are not directly used when a navigation processing unit 112 carries out various navigation functions. "The number of times that the unregistered road has been used" is incremented by one and stored every time when the unregistered road is referred to by the navigation processing unit 112.

When the user selects a menu for changing the layers which are to be updated with addition of an unregistered road with a menu selection screen (not shown) in a state in which information about unregistered roads is stored in the map information storage unit 111, a selection screen (not shown) for enabling the user to select an unregistered road which he or she desires to change from the unregistered roads which have been added to update the map information is displayed, so that the user can select the unregistered road which he or she desires to change. When an unregistered road is selected by the user, a main controlling unit 119 starts the unregistered road frequency use management unit 122 and an unregistered road layers-to-be-updated-with-addition change processing unit 121 so as to change the layers which are to be updated with addition of the unregistered road.

Figure 23:
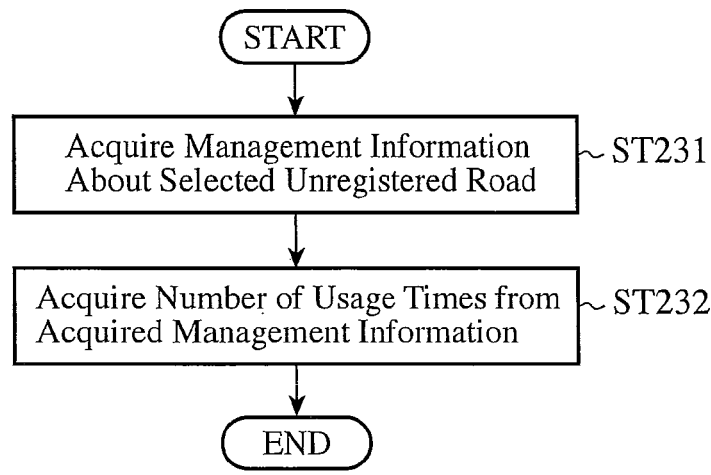
FIG. 23 is a flow chart which is referred to in order to explain the operation of the map information processing apparatus in accordance with Embodiment 8 of the present invention.

FIG. 23 is a flow chart showing the operation of the unregistered road use frequency management unit 122. In FIG. 23, the unregistered road use frequency management unit 122 acquires the management information about the selected unregistered road which is stored in the map information storage unit 111 first (step ST231), and acquires the number of times that the unregistered road has been used from the acquired management information (step ST232). The unregistered road use frequency management unit 122 acquires the number of usage, and then ends the process after delivering data about the number of usage times to the unregistered road layers-to-be-updated-with-addition change processing unit 121 via the main controlling unit 119.

Figure 24:
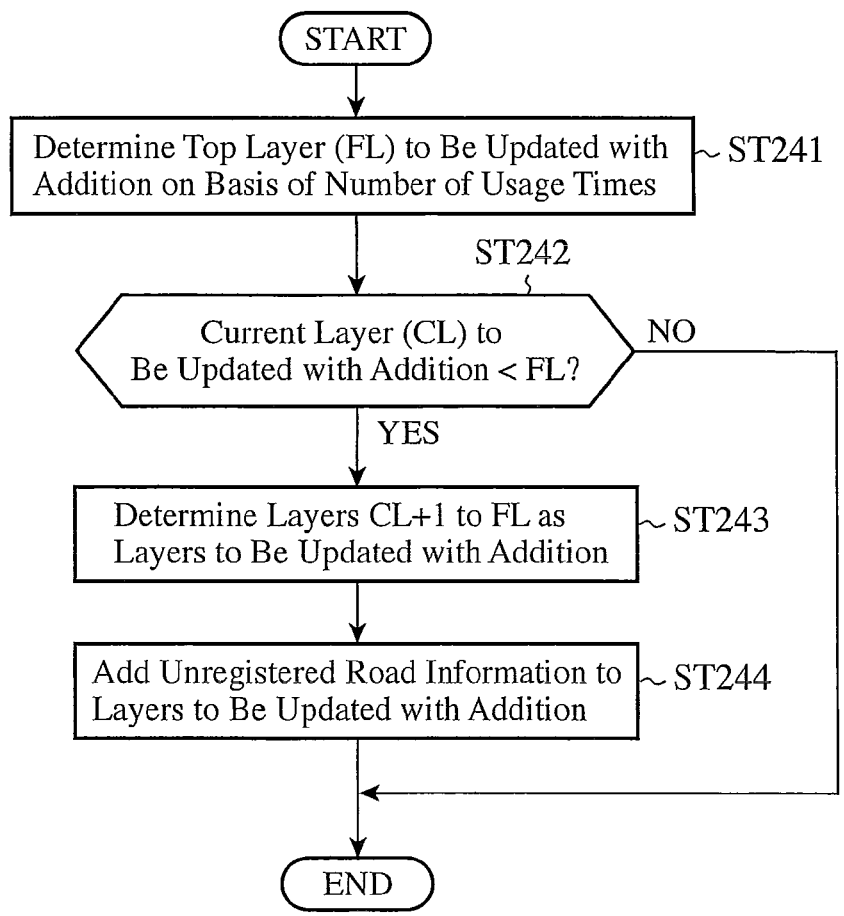
FIG. 24 is a flow chart which is referred to in order to explain the operation of the map information processing apparatus in accordance with Embodiment 8 of the present invention.
Figures 25, 27:
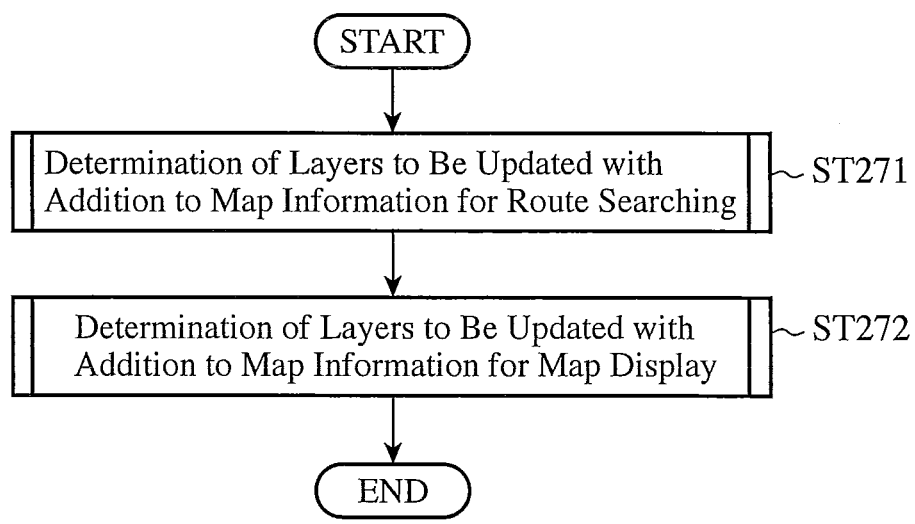
FIG. 25 is a view showing an example of the data structure of a conversion table for use in the map information processing apparatus in accordance with Embodiment 8 of the present invention.
FIG. 27 is a flow chart which is referred to in order to explain the operation of the map information processing apparatus in accordance with Embodiment 9 of the present invention.

FIG. 24 is a flow chart showing the operation of the unregistered road layers-to-be-updated-with-addition change processing unit 121. The unregistered road layers-to-be-updated-with-addition change processing unit 121 determines the top one (FL) of the layers to be additionally updated on the basis of the data about the number of usage times of the unregistered road which are read by the unregistered road use frequency management unit 122 (step ST241). At that time, the unregistered road layers-to-be-updated-with-addition change processing unit 121 refers to a conversion table, as shown in FIG. 25, in which a correspondence between numbers of usage times and map information layers is defined. This conversion table is held within a computer program which implements the layers-to-be-updated-with-addition change processing unit 121.

Next, the unregistered road layers-to-be-updated-with-addition change processing unit 121 compares the number CL showing a current layer which is the target to be updated with addition of the unregistered road with the top one FL of the layers to be additionally updated. In this case, when judging that FL is larger than CL (when "Yes" in step ST242), the unregistered road layers-to-be-updated-with-addition change processing unit 121 determines the layers including from the layer CL+1 to the layer FL as the layers to be additionally updated (step ST243), and adds the information about the unregistered road to the map information about each of the layers to be updated with addition to store it in the map information storage unit 111 (step ST244). After that, the process of the unregistered road layers-to-be-updated-with-addition change processing unit 121 ends.

When, in the process of step ST242, judging that FL is not larger than CL (when "No" in step ST242), the unregistered road layers-to-be-updated-with-addition change processing unit 121 ends the process promptly.

In accordance with above-mentioned Embodiment 8, the unregistered road layers-to-be-updated-with-addition change processing unit 121 can change the layers to be updated with addition of an unregistered road stored in the map information storage unit 111 by using the number of times that the navigation processing unit 112 has used the unregistered road (the use frequency information) which is counted and managed by the unregistered road frequency use management unit 122, thereby making it possible for the navigation system to use a frequently-used unregistered road for navigation with a wider area.

In accordance with above-mentioned Embodiment 8, the navigation system starts the changing process by starting the menu for enabling the user to perform a change of the layers to be updated with addition of an unregistered road. As an alternative, when the number of times that an unregistered road has been used reaches a predetermined number of usage times, the navigation system can automatically change the layers to be set up as the target for update with addition of the unregistered road. Alternatively, when the number of times that an unregistered road has been used reaches a predetermined number of usage times, the navigation system can inquire of the user whether to change the layers to be set up as the target for update with addition of the unregistered road. As a result, the navigation system can change the layers to be set up as the target for update with addition of the unregistered road more flexibly.

Embodiment 9

FIG. 26 is a block diagram showing the internal structure of a map information processing apparatus in accordance with Embodiment 9 of the present invention. Also in this embodiment, a navigation system is illustrated as an example of the map information processing apparatus, as in the case of Embodiment 1. The navigation system differs from that of Embodiment 1 in that map information for route determination 1111 as first map information and map information for map display 1112 as second map information are stored in a map information storage unit 111.

Therefore, a layer-to-be-updated-with-addition determination processing unit 118 determines layers to be additionally updated for each of the map information for route determination 1111 and the map information for map display 1112 which are allocated to the map information storage unit 111, and an unregistered road additional update storage unit 117 adds information about an unregistered road to each of the map information for route determination 1111 and the map information for map display 1112 mentioned above. The other structural components of the navigation system are the same as those of Embodiment 1 shown in FIG. 1.

Hereafter, the operation of the map information processing apparatus in accordance with Embodiment 9 of the present invention will be explained in detail with reference to a flow chart of the operation of the layer-to-be-updated-with-addition determination processing unit 118 shown in FIG. 27.

The layer-to-be-updated-with-addition determination processing unit 118 determines layers to which the information about the unregistered road is to be added for the map information for route determination 1111 (step ST271). This process is carried out according to the flow chart shown in FIGS. 3 and 4 of Embodiment 1. In this process, the layer-to-be-updated-with-addition determination processing unit refers to the map information for route determination 1111 disposed as the first map information.

Next, the layer-to-be-updated-with-addition determination processing unit 118 determines layers to which the information about the unregistered road is to be added for the map information for map display 1112 (step ST272). This process is carried out according to the flow chart shown in FIG. 9 of Embodiment 3. In this process, the layer-to-be-updated-with-addition determination processing unit refers to the map information for map display 1112 disposed as the second map information.

In accordance with above-mentioned Embodiment 9, because the layer-to-be-updated-with-addition determination processing unit 118 defines different layers as the target to be updated with addition of unregistered road information for the first map information and for the second map information, when there is a difference in layers in which the unregistered road information is effective between map display and route determination, a navigation processing unit 112 can use the unregistered road information in the different layers in which the unregistered road information is effective for either of map display and route determination.

Embodiment 10

Figure 28:
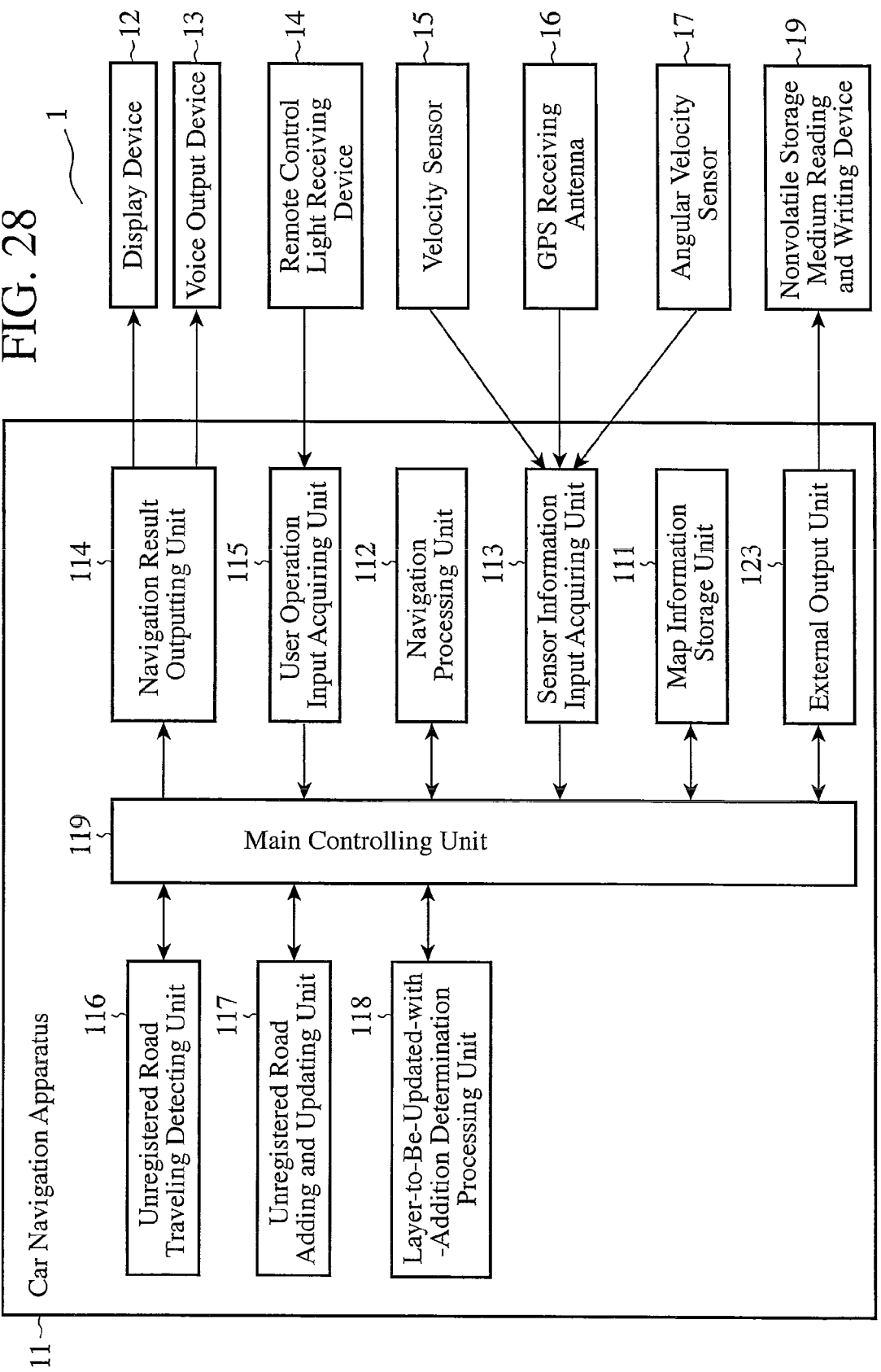
FIG. 28 is a block diagram showing the internal structure of a map information processing apparatus in accordance with Embodiment 10 of the present invention.

FIG. 28 is a block diagram showing the internal structure of a map information processing apparatus in accordance with Embodiment 10 of the present invention. Also in this embodiment, a navigation system is illustrated as an example of the map information processing apparatus, as in the case of Embodiment 1. The navigation system 1 of this Embodiment differs from that of Embodiment 1 in that the navigation system has an external output unit 123 connected to a nonvolatile storage medium reading and writing device 19 which is externally connected to the car navigation apparatus 11. Therefore, the operation of detecting an unregistered road, determining layers to be updated with addition of the unregistered road, and adding the unregistered road information to the map information is the same as that of Embodiment 1, while the operation of the navigation system of this Embodiment differs from that of Embodiment 1 in that the external output unit 123 outputs the unregistered road information which is added to update the map information to outside the navigation system via the nonvolatile storage medium reading and writing device 19 to provide the unregistered road information for a third party.

Figure 29:
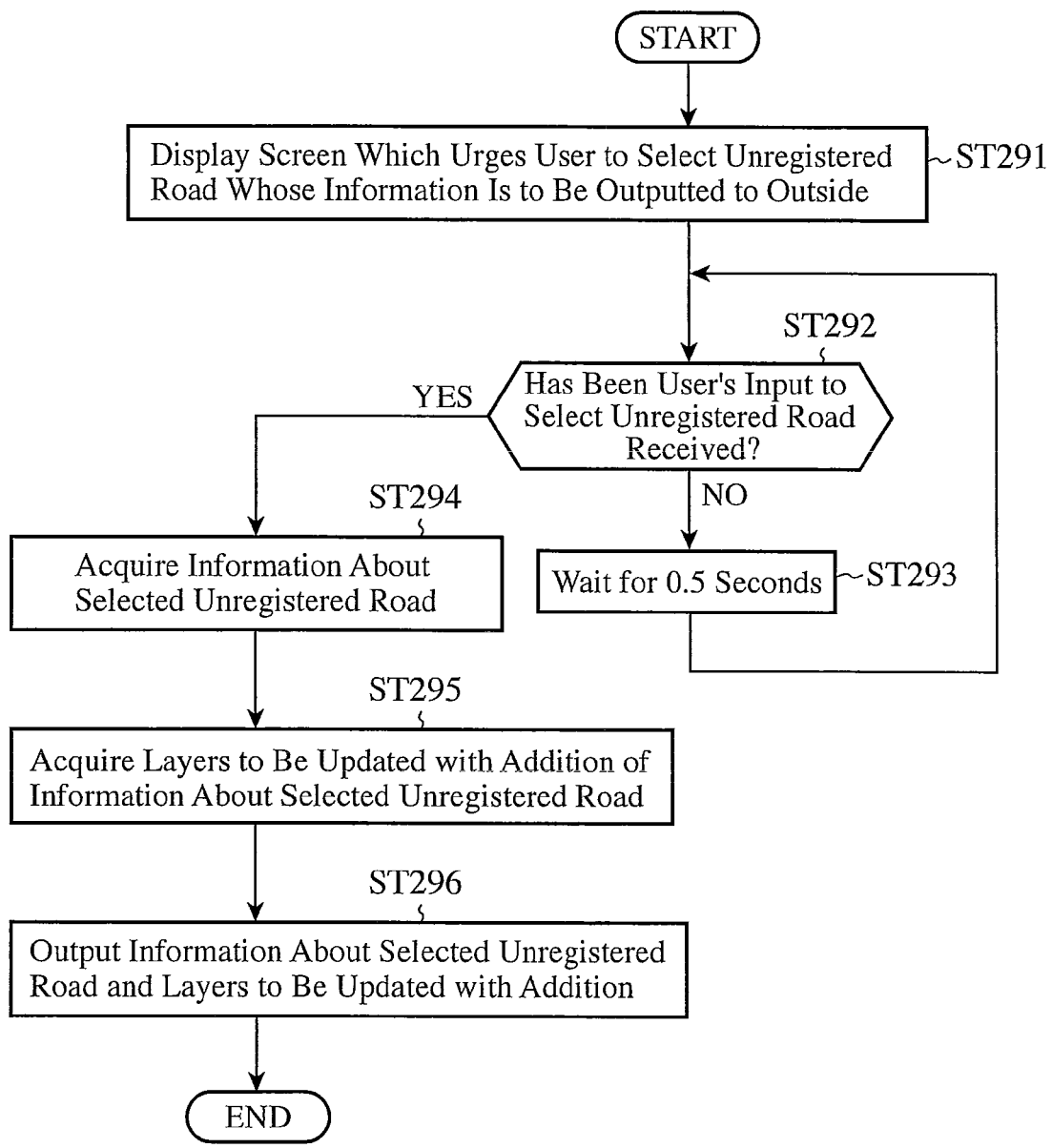
FIG. 29 is a flow chart which is referred to in order to explain the operation of the map information processing apparatus in accordance with Embodiment 10 of the present invention.

FIG. 29 is an operation flow chart which is referred to in order to explain the operation of outputting unregistered road information to outside the map information processing apparatus by using the external output unit 123 of the map information processing apparatus in accordance with Embodiment 10 of the present invention.

Hereafter, the operation of the map information processing apparatus in accordance with Embodiment 10 of the present invention will be explained in detail with reference to the operation flow chart of FIG. 29.

In FIG. 29, after the external output unit 123 displays a screen which urges the user to select unregistered road information which he or she desires to output on a display device 12 first (step ST291), the external output unit judges whether or not it has received an input about selection of unregistered road information to be outputted through the user's manipulation (step ST292). When having not received any input about selection of unregistered road information to be outputted (when "No" in step ST292), the external output unit 123 waits for 0.5 seconds (step ST293), and returns to the process of step ST292.

In contrast, when having received an input about selection of unregistered road information to be outputted (when "Yes" in step ST292), the external output unit 123 acquires the unregistered road information corresponding to the unregistered road selected by the user which is acquired via the user operation input acquiring unit 115 from a map information storage unit 111 (step ST294), and further identifies the layers to which the unregistered road information is added in the map information stored in the map information storage unit 111 (step ST295). Next, the external output unit 123 outputs both the unregistered road information acquired in step ST294 and information about the identification of the layers updated with addition which is identified in step ST295 to the nonvolatile storage medium reading and writing device 19, and ends the process (step ST296).

Both the unregistered road information and the information about the identification of the layers updated with addition of the unregistered road information, which are outputted to the nonvolatile storage medium reading and writing device 19, are stored in a readable and writable nonvolatile storage medium (not shown) which is mounted to the nonvolatile storage medium reading and writing device 19, and is provided to a third party. A third party that has received this readable and writable nonvolatile storage medium has, for example a car navigation apparatus 11 of Embodiment 4 as shown in FIG. 12, and uses those pieces of information according to the operation explained in Embodiment 4. More specifically, the third party is enabled to acquire desired information from the readable and writable nonvolatile storage medium via the external information input acquiring unit 120 (FIG. 12).

In accordance with above-mentioned Embodiment 10, the external output unit 123 outputs unregistered road information which has been added to the map information storage unit 111 to update this map information storage unit and which includes at least information about the coordinates of the unregistered road and information about a map layer which is updated with addition to outside the map information processing apparatus. Therefore, the map information processing apparatus can share the unregistered road information with a third party, and can also provide information about useful layers to the third party as well when providing the unregistered road information to the third party.

In accordance with above-mentioned Embodiment 10, the external output unit 123 is constructed in such a way as to output the registered road information and the information about the layers to be updated with addition together to the nonvolatile storage medium reading and writing device 19. As an alternative, the external output unit can be constructed in such a way as to be connected to a mobile phone instead of the nonvolatile storage medium reading and writing device 19 to output the information to outside the map information processing apparatus via the mobile phone, and this variant can provide the same advantage.

In above-mentioned Embodiments 1 to 10, a CPU which the car navigation apparatus 11 has can implement the functions of the navigation processing unit 112, the sensor information input acquiring unit 113, the navigation result outputting unit 114, the user operation input acquiring unit 115, the unregistered road travel detecting unit 116, the unregistered road adding and updating unit 117, the layer-to-be-updated-with-addition determination processing unit 118, the main controlling unit 119, the external information input acquiring unit 120, the unregistered road additional update layer change processing unit 121, the unregistered road use frequency management unit 122, and the external output unit 123, which construct the car navigation apparatus 11, by controlling a RAM and an LSI for control of peripherals according to a computer program recorded in a built-in ROM.

In this case, the LSI for control of peripherals refers to either a controller to which the display device 12, the voice output device 13, the remote control light receiving device 14, the velocity sensor 15, the GPS receiving antenna 16, the angular velocity sensor 17, the mobile phone 18, and the nonvolatile storage medium reading and writing device 19 are connected, or an input/output port. The above-mentioned map information storage unit 111 is allocated to the RAM so that the map information is stored in the RAM. The above-mentioned RAM includes a large-scale storage, such as an HDD or a DVD, which is externally connected to the map information processing apparatus.

INDUSTRIAL APPLICABILITY

As mentioned above, the map information processing apparatus in accordance with the present invention determines layers which are to be updated with addition of an unregistered road according to the state of the unregistered road, thereby enabling navigation using the unregistered road. Therefore, the map information processing apparatus in accordance with the present invention is suitable for use in a car navigation system and so on.

The invention claimed is:

1. A vehicle navigation device comprising:
a map information storage storing first map information used for route searching and second map information used for map display, each of said first map information and said second map information being separated into multiple hierarchical layers of different scales and different degrees-of-detail including: a bottom layer, at least one middle layer, and a top layer, wherein the bottom layer has meshed map information of a lowest scale and a highest degree-of-detail so as to include more roads than the at least one middle layer and the top layer, and the at least one middle layer has meshed map information of a lower scale and a higher degree-of-detail than the top layer so as to include more roads than the top layer;
a Global Positioning System (GPS) antenna for receiving signals from GPS satellites; and
a processor configured to:
perform route determination on the basis of the first map information;
control a display device to display a map on the basis of the second map information;
determine a position of a vehicle based on said signals received by the GPS antenna, and detecting the existence of an unregistered road by comparing said determined position with information in said map information storage;
determine one or more layers which are to be updated with addition of said unregistered road for each of the first map information and the second map information independently, coordinate information of said unregistered road being detected based on said signals received by said GPS antenna;
add said unregistered road to said map information storage to update the first map information and the second map information with the addition being aimed at the corresponding one or more of the layers determined by said processor for each of the first map information and the second map information, such that said unregistered road is added to at least one layer of the first map information and the second map information, wherein said vehicle navigation device is installed within the vehicle.

2. The vehicle navigation device according to claim 1, wherein said processor determines the one or more of the layers which are to be updated according to one of the following processes (a)-(d):
process (a):
(a-1): analyze each layer of the map information to decide whether the layer has a previously-registered road to which either endpoint of the unregistered road is connected, (a-2): decide the highest of those layers decided in (a-1) to have a previously-registered road to which either endpoint of the unregistered road is connected;
(a-3): determine the bottom layer up to the layer decided in (a-2) as the one or more of the layers which are to be updated;

process (b):
(b-1): analyze each layer of the map information to decide whether the layer has all previously-registered roads to which the endpoints of the unregistered road are connected,
(b-2): decide the highest of those layers decided in (b-1) to have all previous-registered roads to which the endpoints of the unregistered road are connected, and
(b-3): determine the bottom layer up to the layer decided in (b-2) as the one or more of the layers which are to be updated;

process (c):
comparing a distance of said unregistered road with distances stored in correspondence with respective layers of said map information to define a layer for the unregistered road, and determining the bottom layer up to the defined layer as the one or more of the layers which are to be updated; and process (d):
obtaining a degree of use of said unregistered road for route determination, the obtained degree of use being inputted through a user's manipulation of an input device, comparing the obtained degree of use with degrees of use stored in correspondence with respective layers of said map information to define a layer for the unregistered road, and determining the bottom layer up to the defined layer as the one or more of the layers which are to be updated.

3. The vehicle navigation device according to claim 2, wherein the processor determines the one or more layers in accordance with process (a).

4. The vehicle navigation device according to claim 2, wherein the processor determines the one or more layers in accordance with process (b).

5. The vehicle navigation device according to claim 2, wherein the processor determines the one or more layers in accordance with process (c).

6. The vehicle navigation device according to claim 2, wherein the processor determines the one or more layers in accordance with process (d).

7. The vehicle navigation device according to claim 1, wherein
the vehicle navigation device map information processing apparatus further comprises a navigation processing unit for carrying out navigation by using said map information stored in said map information storage, said navigation processing unit having access to data of said unregistered road and the corresponding one or more layers to be used in conjunction with the map information to carry out navigation.

* * * * *

UNITED STATES PATENT AND TRADEMARK OFFICE
CERTIFICATE OF CORRECTION

PATENT NO. : 9,322,659 B2
APPLICATION NO. : 12/441877
DATED : April 26, 2016
INVENTOR(S) : Tomoya Ikeuchi et al.

Page 1 of 1

It is certified that error appears in the above-identified patent and that said Letters Patent is hereby corrected as shown below:

IN THE CLAIMS:

In claim 7, at column 30, lines 21-22, delete "map information processing apparatus".

Signed and Sealed this
Twenty-sixth Day of July, 2016

Michelle K. Lee
*Director of the United States Patent and Trademark Office*